(12) United States Patent
Aghajanian et al.

(10) Patent No.: US 8,128,861 B1
(45) Date of Patent: Mar. 6, 2012

(54) COMPOSITE MATERIALS AND METHODS FOR MAKING SAME

(75) Inventors: Michael K. Aghajanian, Newark, DE (US); Allyn L. McCormick, Lewes, DE (US)

(73) Assignee: M Cubed Technologies, Inc., Trumbull, CT (US)

( * ) Notice: Subject to any disclaimer, the term of this patent is extended or adjusted under 35 U.S.C. 154(b) by 444 days.

(21) Appl. No.: 12/150,597

(22) Filed: Apr. 28, 2008

Related U.S. Application Data

(60) Continuation-in-part of application No. 11/433,056, filed on May 12, 2006, now abandoned, application No. 12/150,597, filed on Apr. 28, 2008, which is a continuation-in-part of application No. 11/185,075, filed on Jul. 19, 2005, now Pat. No. 7,658,781, and a continuation-in-part of application No. 10/336,626, filed on Jan. 3, 2003, now Pat. No. 6,919,127, which is a division of application No. 09/621,562, filed on Jul. 21, 2000, now Pat. No. 6,503,572.

(60) Provisional application No. 60/680,626, filed on May 12, 2005, provisional application No. 60/623,485, filed on Oct. 30, 2004.

(51) Int. Cl.
*B28B 1/00* (2006.01)
(52) U.S. Cl. ........................ 264/682; 501/92; 501/96.1
(58) Field of Classification Search ............... 264/682
See application file for complete search history.

(56) References Cited

U.S. PATENT DOCUMENTS 3,205,043 A 9/1965 Taylor
3,246,275 A 4/1966 Schrewelius
(Continued)

FOREIGN PATENT DOCUMENTS

EP 0 372 708 A 6/1990

OTHER PUBLICATIONS

Leszek Hozer et al., "Phase Composition Control in SiC Composites Prepared by Reactive-Infiltration with Metal-Silicon Alloys", in *Advanced Synthesis and Processing of Composites and Advanced Ceramics, Ceramic Trans.*, v56, American Ceramic Society, Inc., 1995, pp. 157-165.

(Continued)

*Primary Examiner* — Matthew Daniels
*Assistant Examiner* — Russell Kemmerle, III
(74) *Attorney, Agent, or Firm* — Law Office of Jeffrey R. Ramberg

(57) ABSTRACT

Current top performing SAPI systems are $B_4C$-containing (hot pressed $B_4C$ or reaction bonded $B_4C$). These systems will not function well versus future WC/Co threats due to the inability of $B_4C$ to withstand high pressure impacts. New approaches will be needed for next generation SAPI ceramics. Three related concepts are disclosed herein, each of which will lead to improved reaction bonded ceramics for next generation SAPI applications. The first concept aims to reactively heat treat reaction bonded $B_4C$, causing. SiC and $SiB_6$ to form at the expense of $B_4C$. The second approach will add Ti to the system, thus allowing TiC and $TiB_2$ to form at the expense of $B_4C$. Finally, the third concept will evaluate the use of finer particle sizes, thus improving the static properties of the ceramics (with the aim of enhancing multi-hit performance). In all cases, preliminary work has been conducted to demonstrate the viability of the concepts. This will lead to a new family of advanced armor ceramics. These new armor ceramics will allow the modern soldier to be better protected versus next generation, high level threats (e.g., high pressure WC/Co projectiles) with a more ergonomic package (lower weight, less bulk). Further, the results disclosed herein will yield improvement versus the current tool steel threats.

16 Claims, 7 Drawing Sheets

U.S. PATENT DOCUMENTS

| | | | |
|---|---|---|---|
| 3,275,722 | A | 9/1966 | Popper |
| 3,495,939 | A | 2/1970 | Forrest |
| 3,725,015 | A * | 4/1973 | Weaver et al. ............ 428/539.5 |
| 3,859,399 | A | 1/1975 | Bailey et al. |
| 4,148,894 | A | 4/1979 | Hillig et al. |
| 4,174,971 | A | 11/1979 | Schrewelius |
| 4,600,481 | A | 7/1986 | Sane et al. |
| 4,692,418 | A | 9/1987 | Boecker et al. |
| 4,735,923 | A | 4/1988 | Sugarowa et al. |
| 4,981,822 | A | 1/1991 | Singh et al. |
| 5,006,417 | A | 4/1991 | Jackson |
| 5,079,195 | A | 1/1992 | Chiang et al. |
| 5,125,822 | A | 6/1992 | Kasprzyk |
| 5,205,970 | A | 4/1993 | Brun et al. |
| 5,294,489 | A | 3/1994 | Luthra et al. |
| 5,316,851 | A * | 5/1994 | Brun et al. .................. 428/379 |
| 5,382,456 | A | 1/1995 | Hocking et al. |
| 5,441,762 | A | 8/1995 | Gray et al. |
| 5,464,583 | A | 11/1995 | Lessing |
| 5,509,555 | A | 4/1996 | Chiang et al. |
| 5,571,758 | A | 11/1996 | Grossman |
| 5,620,804 | A | 4/1997 | Kennedy et al. |
| 5,840,221 | A | 11/1998 | Lau et al. |
| 5,865,922 | A | 2/1999 | Behrendt et al. |
| 5,945,166 | A | 8/1999 | Singh et al. |
| 6,793,873 | B2 | 9/2004 | Gadow et al. |
| 7,332,221 | B2 * | 2/2008 | Aghajanian et al. .......... 428/408 |
| 2003/0180579 | A1 * | 9/2003 | Waggoner et al. ............ 428/698 |

OTHER PUBLICATIONS

"Reaction-Bonded Silicon Carbide", *Ceramics and Glasses Handbook*, American Society for Materials, p. 293, 1990.

A.J. Whitehead and T.F. Page, "Fabrication and characterization of some novel reaction-bonded silicon carbide materials", *J. Mat. Sci.*, Feb. 1, 1992, pp. 839-852, v.27, No. 3, Chapman and Hall, London, GB.

\* cited by examiner

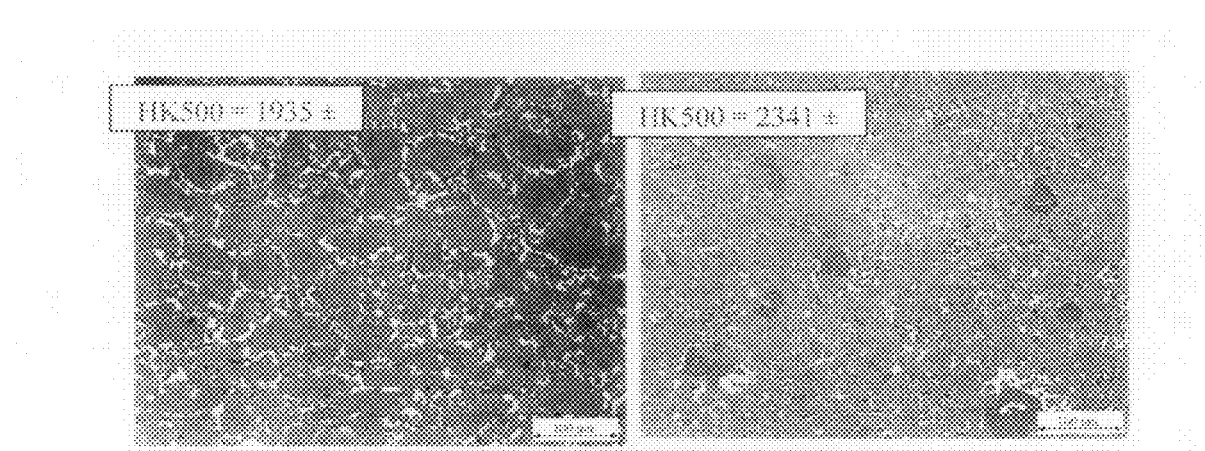

Figure 4: Effect of Reactive Heat Treatment on Microstructure and Hardness of Reaction Bonded $B_4C$ Left, "A": Standard Reaction Bonded $B_4C$ Right, "B": Reaction Bonded $B_4C$ After Reactive Heat Treatment

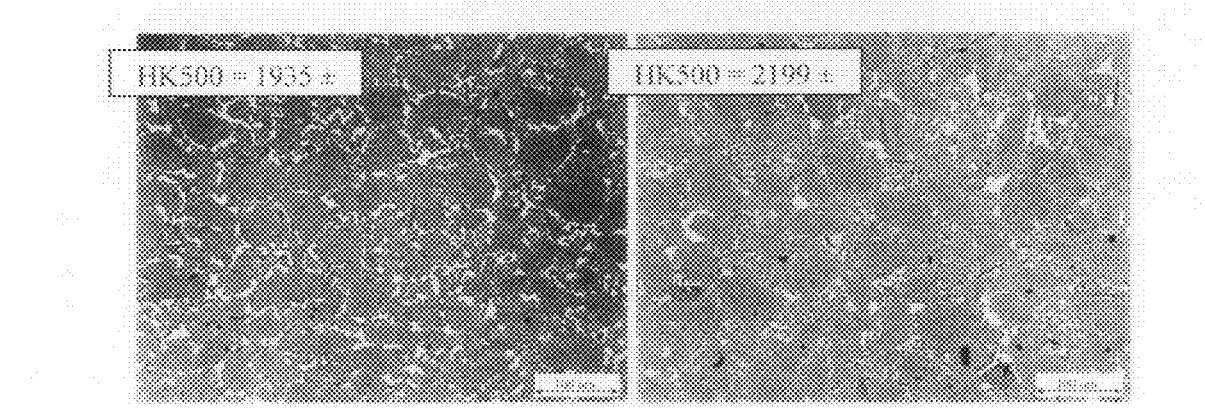

Figure 9: Effect of Infiltrant on Microstructure and Hardness of Reaction Bonded $B_4C$ Left, "A": Standard Reaction Bonded $B_4C$ (Si infiltrant)

Right, "B": Reaction Bonded $B_4C$ Using Si-Ti Alloy Infiltrant

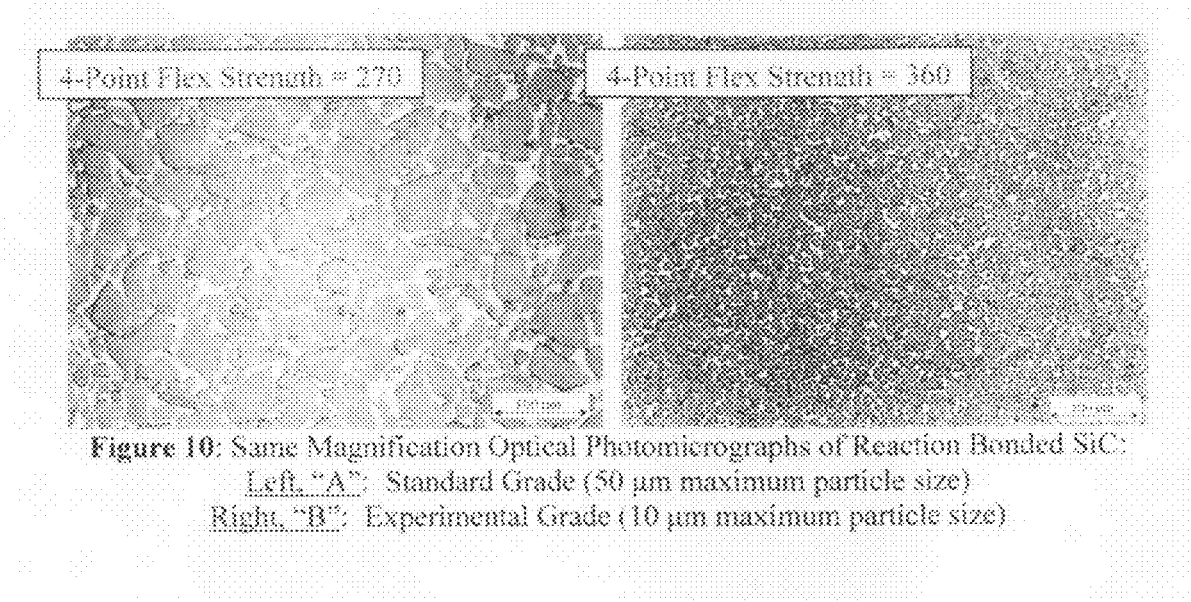
Figure 10: Same Magnification Optical Photomicrographs of Reaction Bonded SiC:
Left "A": Standard Grade (50 μm maximum particle size)
Right "B": Experimental Grade (10 μm maximum particle size)

COMPOSITE MATERIALS AND METHODS FOR MAKING SAME

CROSS-REFERENCE TO RELATED APPLICATIONS

This patent document is a Continuation-in-Part of U.S. patent application Ser. No. 11/433,056, filed on May 12, 2006, now abandoned which claims the benefit of U.S. Provisional Patent Application No. 60/680,626, filed on May 12, 2005. This patent document is also a Continuation-in-Part of U.S. patent application Ser. No. 11/185,075, filed on Jul. 19, 2005, now U.S. Pat. No. 7,658,781 which claims the benefit of U.S. Provisional Patent Application No. 60/623,485, filed loon Oct. 30, 2004, and which U.S. Ser. No. 11/185,075 is a Continuation-in-Part of U.S. patent application Ser. No. 10/336,626, filed on Jan. 3, 2003, now U.S. Pat. No. 6,919,127 which is a Divisional of U.S. patent application Ser. No. 09/621,562, filed on Jul. 21, 2000, which issued as U.S. Pat. No. 6,503,572 on Jan. 7, 2003. The entire contents of each of these commonly owned patents and patent applications is incorporated herein by reference.

BACKGROUND OF THE INVENTION

1. Field of the Invention

This invention relates to metal-ceramic composite bodies produced by a metal infiltration process, e.g., silicon infiltrated composite bodies. More particularly, the invention relates to reaction-bonded and siliconized composite bodies having a boron carbide filler or reinforcement, or a reaction product of boron carbide, and to ballistic armor structures produced from such boron carbide or boron-containing composite bodies. The instant composite bodies are also extremely rigid, which in combination with their low specific gravity potential makes them attractive candidate materials for applications in precision equipment such as machines used to fabricate semiconductors. The instant invention also pertains to modifying the composition of boron carbide-containing composite bodies, to effect changes in properties of the resulting bodies, and/or in the processing parameters used to make the bodies.

2. Discussion of Related Art of Others

Silicon carbide (SiC) composites have been produced by reactive infiltration techniques for decades. In general, such a reactive infiltration process entails contacting molten silicon (Si) with a porous mass containing silicon carbide plus carbon in a vacuum or an inert atmosphere environment. A wetting condition is created, with the result that the molten silicon is pulled by capillary action into the mass, where it reacts with the carbon to form additional silicon carbide. This in-situ silicon carbide typically is interconnected. A dense body usually is desired, so the process typically occurs in the presence of excess silicon. The resulting composite body thus contains primarily silicon carbide, but also some unreacted silicon (which also is interconnected), and may be referred to in shorthand notation as Si/SiC. The process used to produce such composite bodies is interchangeably referred to as "reaction forming", "reaction bonding", "reactive infiltration" or "self bonding".

Reaction bonded silicon carbide (sometimes referred to in shorthand notation as "RBSC") ceramics combine the advantageous properties of high performance traditional ceramics, with the cost effectiveness of net shape processing. Reaction bonded silicon carbide ceramic offers extremely high levels of mechanical and thermal stability. It possesses high hardness, low density (similar to Al alloys) and very high stiffness (~70% greater than steel). These properties lead to components that show little deflection under load, allow small distances to be precisely controlled with fast machine motion, and do not possess unwanted low frequency resonant vibrations. In addition, due to the high stiffness and hardness of the material, components can be ground and lapped to meet stringent flatness requirements. Moreover, as a result of very low coefficient of thermal expansion (CTE) and high thermal conductivity, RBSC components show little distortion or displacement with temperature changes, and are resistant to distortion if localized heating occurs. Furthermore, both Si and SiC possess refractory properties, which yields a composite with good performance in many high temperature and thermal shock applications. Finally, dense, high purity SiC coatings can be applied when extremely high purity and/or superior resistance to corrosion are required.

In many applications, including armor applications, weight is not a critical factor, and traditional materials such as steel can offer some level of protection from airborne threats such as ballistic projectiles and shell fragments. Steel armors offer the advantage of low cost and the fact that they also can serve as structural members of the equipment into which they are incorporated. In recent decades, certain hard ceramic materials have been developed for certain armor applications. These ceramic-based armors, such as alumina, boron carbide and silicon carbide provide the advantage of being lighter in mass than steel for the same ballistic stopping power. Thus, in applications in which having an armor having the lowest possible mass is important, such as (human) body armor and aircraft armor, low specific gravity armor materials are called for. The lower the density, the greater the thickness of armor that can be provided for the same areal density. In general, a thick armor material is more desirable than a thinner one because a greater volume of the armor material can be engaged in attempting to defeat the incoming projectile. Moreover, the impact of the projectile on a thicker armor plate results in less tensile stress on the face of the plate opposite that of the impact than that which would develop on the back face of a thinner armor plate. Thus, where brittle materials like ceramics are concerned, it is important to try to prevent brittle fracture due to excessive tensile stresses on the back face of the armor body; otherwise, the armor is too easily defeated. Rather, by preventing such tensile fracture, the kinetic energy of the projectile perhaps can be absorbed completely within the armor body, which energy absorption manifests itself as the creation of a very large new surface area of the armor material in the form of a multitude of fractures, e.g., shattering.

2.1 Sintered and Hot Pressed Ceramics for Armor Applications

Modern armor systems are required to provide protection against a wide range of projectiles (size, shape, hardness and impacting velocity) at minimal detriment to mobility of the soldier/vehicle (i.e., low weight and flexible). Such systems tend to contain ceramic tiles due to the high mass efficiency with which ceramics defeat projectiles. Until recently, the most common ceramics used within armor systems were sintered $Al_2O_3$, hot pressed SiC and hot pressed $B_4C$. Typical properties of these materials are provided in Table 1.

TABLE 1

Typical Properties of Commercial Sintered and Hot Pressed Armor Ceramics [1, 2]

| | Source | Hardness (GPa) | Density (g/cc) | Young's Modulus (GPa) | Flexural Strength (MPa) | Fracture Toughness (MPa-m$^{1/2}$) |
|---|---|---|---|---|---|---|
| Sintered Al$_2$O$_3$ | Ceramic Protection Corporation (CPC) Grade PTEX-300 | 14 | 3.81 | 275 | 310 | 3.4 |
| Hot Pressed SiC | Ceradyne Grade 146-3E | 23 | 3.20 | 450 | 634 | 4.3 |
| Hot Pressed B$_4$C | Ceradyne Grade 546-3E | 32 | 2.50 | 460 | 410 | 2.5 |

Owing to its low cost relative to SiC and B$_4$C, sintered Al$_2$O$_3$ is often used in vehicle armor systems. However, due to its lower hardness and higher density, it is not suited to applications that have aggressive weight goals, such as personnel and aircraft armor systems. These systems tend to contain B$_4$C or SiC.

Moreover, in many high performance applications, B$_4$C is selected. Because of its very low density and very high hardness, it tends to provide the most weight-effective armor systems (particularly vs. light threats). The two primary drawbacks of hot pressed B$_4$C are high cost and low fracture toughness.

In one of the earlier demonstrations of this technology, Popper (U.S. Pat. No. 3,275,722) produced a self-bonded silicon carbide body by infiltrating silicon into a porous mass of silicon carbide particulates and powdered graphite in vacuo at a temperature in the range of 1800 to 2300° C.

Taylor (U.S. Pat. No. 3,205,043) also produced dense silicon carbide bodies by reactively infiltrating silicon into a porous body containing silicon carbide and free carbon. Unlike Popper, Taylor first made a preform consisting essentially of granular silicon carbide, and then he introduced a controlled amount of carbon into the shaped mass. In one embodiment of his invention, Taylor added the carbon in the form of a carbonizable resin, and then heated the mass containing the silicon carbide and infiltrated resin to decompose (carbonize) the resin. The shaped mass was then heated to a temperature of at least 2000° C. in the presence of silicon to cause the silicon to enter the pores of the shaped mass and react with the introduced carbon to form silicon carbide.

U.S. Pat. No. 5,372,978 to Ezis discloses a projectile-resistant armor consisting predominantly of silicon carbide and made by a hot pressing technique. Up to about 3 percent by weight of aluminum nitride may be added as a densification aid. The finished product features a microstructure having an optimal grain size of less than about 7 microns. Fracture is intergranular, indicating energy-absorbing crack deflection. Moreover, the economics of manufacturing are enhanced because less expensive, less pure grades of silicon carbide can be used without compromising the structural integrity of the material.

U.S. Pat. No. 4,604,249 to Lihleich et al. discloses a composition particularly suited for armoring vehicles. The composition is a composite of silicon carbide and steel or steel alloy. Silicon and carbon particulates, optionally including silicon carbide particulates, are mixed with an organic binder and then molded to form a green body. The green body is then coked at a maximum temperature in the range of about 800° C. to about 1000° C. The temperature is then rapidly raised to the range of about 1400° C. to about 1600° C. under an inert atmosphere of at least one bar pressure. In this temperature range, the silicon and carbon react to form silicon carbide, thereby producing a porous body. The pores are then evacuated in a vacuum chamber, and the body is immersed in molten steel or steel alloy. The metal fills up the pores to produce a dense composite armor material.

In spite of the many outstanding properties, including high specific stiffness, low coefficient of thermal expansion, and high thermal conductivity enumerated above, reaction bonded SiC ceramics generally have low fracture toughness, and therefore may not be optimal in applications where impact loading will occur.

In response, materials investigators have experimented with various techniques for enhancing the toughness or impact resistance of such inherently brittle ceramic-rich materials. Perhaps the most popular approach has been to incorporate fibrous reinforcements and attempt to achieve crack deflection or fiber debonding and pull-out mechanisms during the crack propagation process.

Hillig and his colleagues at the General Electric Company, motivated in part by a desire to produce silicon carbide refractory structures having higher impact strength than those of the prior art, produced fibrous versions of Si/SiC composites, specifically by reactively infiltrating carbon fiber preforms. See, for example, U.S. Pat. No. 4,148,894.

More recently, German Patent Publication No. DE 197 11 831 to Gadow et al. disclosed a reaction-bonded silicon carbide composite body featuring high heat resistant fibers, in particular those based on silicon/carbon/boron/nitrogen, for example, carbon or silicon carbide. The composite body was formed by the melt infiltration of a silicon alloy into a porous preform containing the fibers. The alloying element for the silicon-based infiltrant may consist of iron, chromium, titanium, molybdenum, nickel and/or aluminum, with iron and chromium being preferred, and with 5-50% iron and 1-10% chromium being particularly preferred. The alloying addressed the problem of the jump-like internal strain caused by the volume increase of silicon upon freezing. Previously, in large or thick-walled articles, this cooling strain was sufficiently large in many cases as to manifest itself as microfractures throughout the composite body. Thus, the stability of the material was reduced, and a critical growth of the fractures was to be expected under application of alternating thermal and mechanical stress. Accordingly, by alloying the silicon phase, the jump-like strain was reduced or even avoided, thereby solving the problems associated with the silicon cooling strain. The exchange of some brittle silicon for a different metal also led to a clear increase in toughness and ductility of the composite body.

At a minimum, the matrix of Gadow et al. contains iron. In a further refinement, it is preferred to add to the iron-containing silicon matrix, further additives of chromium, titanium, aluminum, nickel or molybdenum in a suitable ratio for the formation of a passivation layer, so that it results in improved oxidation resistance and corrosion resistance. With specific regard to the aluminum addition, it is known from ferrous metallurgy that aluminum is never present in iron-based alloys in amounts more than about one or two percent. This is because aluminum is chemically reactive with iron, and additions of aluminum to iron will tend to form iron aluminides rather than result in elemental aluminum dissolved in iron.

In spite of the toughening afforded by the alloying, Gadow et al. still rely on fibrous reinforcement. In fact, they attribute part of the strength of the composite to its fibrous reinforcement, and the fact that they treated the fibers gently during the granulation process so as to not damage them and thus impair their strength. Fibers, particularly fibers based on silicon carbide, can be expensive. Further, short fibers such as chopped fibers or whiskers, can pose a health hazard, and efforts must be taken to insure that such fibers do not become airborne or breathed. Fibers are often added to a ceramic composition to enhance toughness through debonding and pull-out relative to the matrix. If another way could be found to toughen the silicon carbide composite bodies of interest, then one could dispense with the fibers.

Further, at least some of the infiltrant alloy compositions disclosed by Gadow, such as Fe35-Si65 alloy, have a melting point below that of pure silicon, and it would seem possible and even advantageous to take advantage of this phenomenon. Gadow acknowledges the lower melting point, but fails to take advantage of it, and instead recommends infiltrating at temperatures well above the silicon melting point, such as at 1550° C. and 1700° C., in his Examples 1 and 2, respectively.

Chiang et al. (U.S. Pat. No. 5,509,555) disclosed the production of composite bodies by a pressureless reactive infiltration. The preform to be infiltrated by the alloy can consist of carbon or can consist essentially of carbon combined with at least one other material such as a metal like Mo, W, or Nb; a carbide like SiC, TiC, or ZrC; a nitride like $Si_3N_4$, TiN or AlN; an oxide like $ZrO_2$ or $Al_2O_3$; or an intermetallic compound like $MoSi_2$ or $WSi_2$, or mixtures thereof. In any event, the preform bulk density is rather low, about 0.20-0.96 g/cc. The liquid infiltrant included silicon and a metal such as aluminum, copper, zinc, nickel, cobalt, iron, manganese, chromium, titanium, silver, gold, platinum and mixtures thereof.

In a preferred embodiment of the Chiang et al. invention, the preform could be a porous carbon preform, the liquid infiltrant alloy could be a silicon-aluminum alloy containing in the range of from about 90 at % to about 40 at % silicon and in the range of from about 10 at % to about 60 at % aluminum and the carbon preform could be contacted with the silicon-aluminum alloy at a temperature in the range of from about 900° C. to about 1800° C. for a time sufficient so that at least some of the porous carbon reacted to form silicon carbide. Upon cooling, the dense composite formed thereby can be characterized by a phase assemblage comprising silicon carbide and at least one phase such as silicon-aluminum alloy, a mixture of silicon and aluminum, substantially pure aluminum or mixtures thereof.

One problem with infiltrating multi-constituent liquids into preforms containing large fractions of carbon is that the infiltrant chemistry can change dramatically over the course of infiltration, as well as from one location to another within the preform. Table 3 of Chiang et al. demonstrates this point. There, the infiltrant started out as being about 54 at % Si, 46 at % Cu, but after infiltration into a carbon preform, it was substantially 100% Cu. Such drastic compositional changes can make processing difficult; this same Table revealed that when the infiltrant alloy started out at about 30 at % Si, 70 at % Cu, pressure was required to achieve infiltration. Pressure infiltrations require much more complex and expensive equipment than do pressureless infiltration techniques, and usually are more limited in the size and shape of the parts that can be produced thereby. Thus, while the present invention is not limited to pressureless systems, unless otherwise noted, the infiltrations of the present invention refer to those not requiring the application of pressure.

Chiang et al. stated that their method allows production of composites very near net-shape without a need for additional machining steps. They described a number of non-machining techniques for removing the residual, unreacted liquid infiltrant alloy remaining on the reacted preform surface. Specifically, Chiang et al. stated that following infiltration, the composite body could be heated to a temperature sufficient to vaporize or volatilize the excess liquid alloy on the surface. Alternatively, the reacted preform could be immersed in an etchant in which the excess unreacted liquid infiltrant is dissolved while the reacted preform is left intact. Still further, the reacted preform could be contacted with a powder that is chemically reactive with the unreacted liquid infiltrant alloy such as carbon, or a metal like Ti, Zr, Mo or W.

In U.S. Pat. No. 5,205,970, Milivoj Brun et al. also was concerned with removing excess infiltrant following production of silicon carbide bodies by an infiltration process. Specifically, Brun et al. contacted the reaction formed body with an infiltrant "wicking means" such as carbon felt. More generally, the wicking means could comprise porous bodies of infiltrant wettable materials that are solid at the temperature at which the infiltrant is molten. Preferably, the wicking means has capillaries that are at least as large or larger than the capillaries remaining in the reaction formed body. Thus, infiltrant in the reaction-formed body that was filling porosity remained in the reaction formed body instead of being drawn into the wicking means and leaving porosity in the reaction formed body. The infiltrant could be silicon or a silicon alloy containing a metal having a finite solubility in silicon, the metal being present up to its saturation point in silicon.

The "wicking means" solution of Brun et al. to the problem of removing excess adhered silicon, while perhaps effective, nevertheless requires the additional processing steps of contacting the formed composite body with the wicking means and re-heating to above the liquidus temperature. What is needed is a means for eliminating or at least minimizing the degree of residual infiltrant adhered to the formed composite body.

2.2 Reaction Bonded Ceramics for Personnel Armor Applications

Reaction bonded SiC (sometimes referred to as "RBSC") was first developed in the 1960's [3-5]. Other terms for the process include 'reaction sintered' and 'self bonded' [6]. Conventionally, the process consists of Si infiltration (liquid or vapor) into preforms of SiC+carbon. During the infiltration step, the Si and carbon react to form SiC. Typically, all carbon is consumed, yielding a product of porous SiC (vapor infiltration) or dense Si/SiC (liquid infiltration). The maximum SiC particle size used in the production of such bodies is generally in excess of a few hundred microns [3,4].

U.S. Pat. No. 3,725,015 to Weaver discloses composite refractory articles that, among other applications, have utility as an armor material for protection against penetration by ballistic projectiles. These compositions are prepared by cold pressing a mixture of a powdery refractory material (which could be boron carbide) and about 10 to 35 parts by volume of a carbon containing substance, such as an organic binder material or elemental carbon carbonaceous material to form a preform, heat-treating the preform to convert the carbonaceous material to carbon, and then contacting the heated preform with a molten metal bath, the bath containing at least two metals and maintained at a temperature between 1700° C. and 1900° C. The molten metal infiltrates the preform, the refractory material matrix sinters and at least one of the metallic constituents reacts with the carbon to produce a metal carbide. Because the thermal expansion coefficient of the metal mixture is close to or slightly greater than that of the refractory matrix, the composite shape cools to room temperature essentially free of cracks and residual stress. Weaver states that, while there are no rigid particle size parameters except those dictated by the properties desired in the final product, a maximum size of about 350 microns for the particles of the powdered materials that make up the mixture to be pressed is preferred. Further, he recommends adding to the metal mixture the same metal as the metal constituent of the refractory material. For example, he says that if boron carbide is the refractory material, the incorporation of about 6% of boron in the molten metal mixture prevents the dissolution of boron out of the boron carbide.

U.S. Pat. No. 4,104,062 to Weaver discloses a high density, aluminum-modified boron carbide composition that is well suited as protective armor against ballistic projectiles. About 70 to 97 percent by weight of boron carbide powder is blended with about 3 to about 30 percent of aluminum powder. A temporary binder is added to this mixture, and a preform is pressed. This preform is then hot pressed in an oxygen-free atmosphere at a pressure of at least 500 psi (3.5 MPa) at a temperature of from 1800° C. to about 2300° C.

U.S. Pat. No. 3,857,744 to Moss discloses a method for manufacturing composite articles comprising boron carbide. Specifically, a compact comprising a uniform mixture of boron carbide particulate and a temporary binder is cold pressed. Moss states that the size of the boron carbide particulate is not critical; that any size ranging from 600 grit to 120 grit may be used. The compact is heated to a temperature in the range of about 1450° C. to about 1550° C. where it is infiltrated by molten silicon. The silicon is not stated as containing any dissolved boron or carbon. The binder is removed in the early stages of the heating operation. The silicon impregnated boron carbide body may then be bonded to an organic resin backing material to produce an armor plate.

U.S. Pat. No. 3,859,399 to Bailey discloses infiltrating a compact comprising titanium diboride and boron carbide with molten silicon at a temperature of about 1475° C. The compact further comprises a temporary binder that, optionally, is carbonizable. Although the titanium diboride remains substantially unaffected, the molten silicon reacts with at least some of the boron carbide to produce some silicon carbide in situ. The flexural strength of the resulting composite body was relatively modest at about 140 MPa. A variety of applications are disclosed, including personnel, vehicular and aircraft armor.

U.S. Pat. No. 3,796,564 to Taylor et al. discloses a hard, dense carbide composite ceramic material particularly intended as ceramic armor. Granular boron carbide is mixed with a binder, shaped as a preform, and rigidized. Then the preform is thermally processed in an inert atmosphere with a controlled amount of molten silicon in a temperature range of about 1500° C. to about 2200° C., whereupon the molten silicon infiltrates the preform and reacts with some of the boron carbide. The formed body comprises boron carbide, silicon carbide and silicon. Taylor et al. state that such composite bodies may be quite suitable as armor for protection against low caliber, low velocity projectiles, even if they lack the optimum properties required for protection against high caliber, high velocity projectiles. Although they desire a certain amount of reaction of the boron carbide phase, they also recognize that excessive reaction often causes cracking of the body, and they accordingly recognize that excessive processing temperatures and excessively fine-grained boron carbide is harmful in this regard. At the same time, they also realize that excessively large-sized grains reduce strength and degrade ballistic performance.

A major advantage of the reaction bonding process is that the volume of the reaction-formed SiC is 2.3 times larger than the volume of the reacted carbon. Thus, by infiltrating Si into preforms that contain high carbon contents, ceramic bodies rich in SiC can be produced.

The reaction bonding process has several advantages relative to traditional ceramic processes (e.g., hot pressing, sintering). First and foremost, volume change during processing is very low (generally well less than 1%), which provides very good dimensional tolerance control and eliminates the need for final machining. In addition, the process requires relatively low process temperatures and no applied pressure, which reduces capital and operating costs. Moreover, fine high surface area powders capable of being densified are not required, which reduces raw material cost.

However, the vast majority of commercial reaction bonded SiC ceramics have coarse microstructures. This is due to the use of large SiC particles in the preforms and the fact that many of these materials are made using high levels of carbon in the preform. As the carbon reacts in an expansive manner with the Si to form SiC, the SiC particles in the preform are networked together to form large SiC clusters. Since the strength of a ceramic is controlled by the largest flaw within the stressed volume, a coarse grained material will tend to have low strength. Therefore, reaction bonded SiC ceramics are traditionally used for high temperature, creep, corrosion and wear sensitive applications, but not structural (strength critical) applications.

In the Third TACOM Armor Coordinating Conference in 1987, Viechnicki et al. reported on the ballistic testing of a RBSC material versus sintered and hot pressed silicon carbide materials. Not only was the RBSC substantially inferior to the other silicon carbides, Viechnicki et al. came to the general conclusion that purer, monolithic ceramics with minimal amounts of second phases and porosity have better ballistic performance than multiphase and composite ceramics. (D. J. Viechnicki, W. Blumenthal, M. Slavin, C. Tracy, and H. Skeele, "Armor Ceramics—1987," Proc. Third TACOM Armor Coordinating Conference, Monterey, Calif. (U.S. Tank-Automotive Command, Warren, Mich., 1987) pp. 27-53).

Accordingly, in spite of the price advantage of RBSC relative to sintered or hot pressed silicon carbide, what the market has preferred has been a sintered or hot pressed monolithic ceramic product. In fact, according to some sources, RBSC had developed a reputation as not being worthy of serious consideration as an armor material.

The details of a ballistic impact event are complex. One widely held theory of defeating a ballistic projectile is that the armor should be capable of fracturing the projectile, and then erode it before it penetrates the armor. Thus, compressive strength and hardness of a candidate armor material should be important. The above-mentioned armor patent to Taylor et al., for example, suggests a correlation between strength and ballistic performance. They noted that when the size of the largest grains exceeded 300 microns, both modulus of rupture and ballistic performance deteriorated. Keeping the size of the boron carbide grains below about 300 microns in diameter permitted their reaction-bonded boron carbide bodies to attain moduli of rupture as high as 260 MPa, and they recommended that for armor applications the strength should be at least 200 MPa.

There seems to be a consensus in the armor development community that hardness is indeed important in a candidate armor material, and in particular, that the hardness of the armor should be at least as great as the hardness of the projectile. As for the strength parameter, however, those testing armor materials have had a difficult time correlating mechanical strength (both tensile and compressive) with ballistic performance. In fact, except for hardness, there seems to be no single static property that functions as a good predictor of good armor characteristics in ceramic materials. Instead, the guidance that has been provided from the armor developers to the materials developers based upon actual ballistic tests has been that candidate armors in general should possess a combination of high hardness, high elastic modulus, low Poisson's ratio and low porosity. (Viechnicki et al., p. 32-33)

As described in a recent paper [7], M Cubed Technologies, Inc. has optimized the reaction bonding process to allow relatively fine grained SiC and $B_4C$ ceramics with favorable mechanical and ballistic properties to be produced. Typical mechanical properties of the novel reaction bonded ceramics are provided in Table 2.

TABLE 2

Typical Properties of Reaction Bonded SiC and $B_4C$ Ceramics

| | Source | Hardness (GPa) | Density (g/cc) | Young's Modulus (GPa) | Flexural Strength (MPa) | Fracture Toughness (MPa-m$^{1/2}$) |
|---|---|---|---|---|---|---|
| Reaction Bonded SiC (Si/SiC) | M Cubed Technologies Grade SSC-A3-82 | 22 | 3.06 | 384 | 284 | 3.9 |
| Reaction Bonded $B_4C$ (Si/SiC/$B_4C$) | M Cubed Technologies Grade RBBC-751 | 28 | 2.57 | 382 | 278 | 5.0 |

The property data in Table 2 clearly show some of the advantages of the reaction bonded ceramics, including high hardness and low density (especially for the $B_4C$ product). In addition, the reaction bonded $B_4C$ possesses an extremely high fracture toughness that is 2 times that of the hot pressed $B_4C$ (Table 1).

To date, the US Army and Marines have been supplied with hundreds of thousands of multi-curved ceramic tiles (both reaction bonded SiC and $B_4C$) for use in SAPI ("small arms protective inserts") products. The majority of present efforts are focused on the production of reaction bonded $B_4C$ tiles for use in E-SAPI ("enhanced SAPI") plates. Against the E-SAPI threat (tool steel), reaction bonded $B_4C$ provides a good single shot $V_{50}$ due to its high hardness, and demonstrates good multi-hit performance relative to hot pressed $B_4C$ due to its high toughness.

2.3 Issues with $B_4C$ and Si for Next Generation SAPI Ceramics:

Over the past 5 years, SAPI specifications have changed to meet the changing requirements in the field. Originally, the pacing threats were ball rounds (lead or soft steel). More recently, aggressive AP rounds (tool steel) have been added. In the future, it is quite possible that even more aggressive WC/Co-based AP rounds (e.g., M993) will appear on the battlefield. At this time, it will be necessary to have SAPI systems capable of providing weight and cost efficient armor protection for such threats.

The vast majority of ceramics currently being used in SAPI systems fall into two major categories, namely:
1. Hot Pressed $B_4C$
2. Reaction Bonded $B_4C$ (composite of $B_4C$, SiC and Si)
Issues exist with both of these materials for defeat of WC/Co AP ballistic threats. As is shown in Table 3, the pressure applied to a target by a WC/Co penetrator is far greater than that applied by a tool steel penetrator. Moreover, as shown in Table 4, $B_4C$ and Si undergo phase transformations when exposed to high pressure loads. Comparing data in the two tables clearly demonstrates WC/Co projectiles can apply pressures that will result in phase transformations of both $B_4C$ and Si. Such transformations cause volume changes that will result in damage to the solid material.

TABLE 3

Pressures Applied to Targets by 7.62 mm Projectiles Constructed of Tool Steel and WC/Co [10]

| Projectile Type | Projectile Construction Material | Hardness of Projectile (kg/mm$^2$) | Pressure Applied by Projectile During Muzzle Velocity Impact (GPa) |
|---|---|---|---|
| 7.62 × 54 R mm B32 | Tool Steel | 920 HV | ~15 |
| 7.62 × 51 mm NATO FFV | WC/Co | 1550 HV | ~23 |

TABLE 4

Threshold Pressures for Phase Transformations in Si and $B_4C$

| Material | Pressure at Which Phase Transformation Occurs (GPa) | Reference |
|---|---|---|
| Si | ~16 | 11-12 |
| $B_4C$ | ~20 | 13 |

Thus, new ceramic materials will be needed for future SAPI requirements. Moreover, the result of research and development activities aimed at producing such novel ceramics will lead to increased performance versus the current tool steel threats.

3. Discussion of Commonly Owned Patents

U.S. Pat. No. 6,503,572 to Waggoner et al., teaches that reaction-bonded or reaction-formed silicon carbide bodies may be formed using an infiltrant comprising silicon plus at least one metal, e.g., aluminum. Modifying the silicon phase in this way permits tailoring of the physical properties of the resulting composite, and other important processing phenomena result: Such silicon carbide composite materials are of interest in the precision equipment, robotics, tooling, armor, electronic packaging and thermal management, and semiconductor fabrication industries, among others. Specific articles of manufacture contemplated include semiconductor wafer handling devices, vacuum chucks, electrostatic chucks, air bearing housings or support frames, electronic packages and substrates, machine tool bridges and bases, mirror substrates, mirror stages and flat panel display setters.

U.S. Pat. No. 6,609,452 to McCormick et al. teaches that a fine-grained reaction-bonded composite material can provide excellent ballistic properties, particularly against small arms fire. By "fine-grained" what is meant is that no more than about 10 percent by volume of the morphological features making up the microstructure of the composite material should be permitted to be much above about 100 microns in size. The composite material preferably is highly loaded in one or more hard reinforcement substances, with silicon carbide being particularly preferred.

U.S. Pat. No. 6,862,970 to Aghajanian et al. teaches a composite body produced by a reactive infiltration process that possesses high mechanical strength, high hardness and high stiffness has applications in such diverse industries as precision equipment and ballistic armor. Specifically, the composite material features a boron carbide filler or reinforcement phase, and a silicon carbide matrix produced by the reactive infiltration of an infiltrant having a silicon component with a porous mass having a carbonaceous component. Potential deleterious reaction of the boron carbide with silicon during infiltration is suppressed by alloying or dissolving boron into the silicon prior to contact of the silicon infiltrant with the boron carbide.

WIPO Patent Publication No. WO 2005/079207 to Aghajanian et al. teaches that a boron carbide-containing preform that furthermore contains substantially no reactable carbon can be infiltrated with molten silicon or silicon alloy to form a composite body featuring boron carbide dispersed throughout a metal matrix containing silicon. Such a composite material may be referred to as "siliconized boron carbide". This patent publication furthermore teaches that carbon alloyed or dissolved into the molten silicon prior to contact with the boron carbide of the preform may also help suppress chemical reaction of the boron carbide with the silicon.

The teachings of these commonly owned Patents and Patent Publications are incorporated herein by reference.

SUMMARY OF THE INVENTION

Various embodiments of the instant invention have demonstrated the following:
- a composite material that is lightweight, stiff, strong and substantially pore-free;
- a composite material that has utility in precision equipment and nuclear power applications;
- a composite material produced by a silicon infiltration process that features a significant fraction of boron carbide;
- a reaction-bonded boron carbide composite material in which chemical reaction of the boron carbide phase with the molten silicon infiltrant during processing is attenuated or suppressed;
- a reaction-bonded boron carbide composite material in which chemical reaction of the boron carbide phase with the molten silicon infiltrant during or following infiltration is encouraged, but under controlled and possibly limited conditions;
- a silicon-infiltrated boron carbide composite material that, due to attenuation or chemical reaction between boron carbide and silicon, features a smaller or finer grain size of the boron carbide phase than would be possible absent the diminution in chemical reaction;
- a silicon-containing composite body of improved toughness, preferably without reliance on fibrous reinforcement as a toughening mechanism;
- a composite body produced by an infiltration process whereby the residual infiltrant phase has a controllable volume change upon solidification;
- a composite body of increased thermal conductivity;
- a composite body whose physical properties are at least somewhat tailorable by the presence of the additional metallic constituent(s) in the infiltrant material;
- the ability to produce a composite body at a temperature that is less than the melting point of pure silicon;
- the ability to produce a composite body without having to rely on boron-containing materials or expensive molds being in direct contact with the preform or infiltrant material to control the extent of infiltration, e.g., "infiltration blockers";
- the ability to produce composite bodies that are large, unitary structures;
- the ability to produce composite bodies of complex shape that are highly loaded in reinforcement material;
- the ability to produce composite bodies containing little to no in-situ silicon carbide phase;
- the ability to produce composite bodies in large numbers at a high rate of speed;
- the ability to produce a composite body to near-net shape, thereby minimizing the amount of grinding and/or machining necessary to achieve the required dimensions of the finished article;
- the ability to produce a composite body where any required grinding or machining can be performed substantially entirely at the preform stage; and/or
- the ability to produce a composite body where fine detail can be ground and/or machined into the body at the preform stage.

These and other desirable attributes can be achieved through the application and engineering of boron carbide composite bodies containing boron carbide, and/or a reaction product of boron carbide. In accordance with a preferred, but by no means the only embodiment of the instant invention, a molten infiltrant containing silicon and one or more sources of boron is contacted to a porous mass that contains at least some boron carbide, and also containing at least some reactable or "free" carbon. The molten infiltrant infiltrates the porous mass without a pressure or vacuum assist to form a composite body of near theoretical density. The silicon component of the infiltrant reacts with the free carbon in the porous mass to form in-situ silicon carbide as a matrix phase. Further, the tendency of the molten silicon to react with the boron carbide component can be suppressed or at least greatly attenuated by the alloying or doping of the silicon with one or both of a boron source and a carbon source. The resulting composite body thus comprises boron carbide dispersed or distributed throughout the silicon carbide matrix. Typically, some residual, unreacted infiltrant phase containing silicon and small but detectable amounts of boron and carbon is also present and similarly distributed or interspersed throughout the matrix. Thus, these composite materials may be referred to in shorthand notation as $Si/SiC/B_4C$. In another aspect or embodiment of the invention, the infiltrant material comprises an auxiliary or non-silicon constituent whose purpose is to modify one or more properties or characteristics of the resulting composite body, or to permit a modification of one or more processing parameters.

Reaction formed composites featuring a boron carbide reinforcement possess stiffness (e.g., elastic or Young's Modulus) comparable to their counterparts featuring the usual silicon carbide reinforcement, but exhibit a lower specific gravity for the same volumetric filler loading. Accordingly, such $B_4C$ reinforced SiC composites will find utility in applications requiring low mass and high stiffness, such as equipment requiring precise motion control, often at high accelerations. Further, because of the extreme hardness and low specific gravity of boron carbide, such composites are attractive armor material candidates.

However, under more aggressive ballistic impact conditions, the silicon and boron carbide constituents of the composite materials can phase transform. The volume change associated with this transformation can further damage the material. Accordingly, and in a first embodiment of the instant invention, at least a portion of the boron carbide is allowed to chemically react with the silicon metal or alloy to form different compounds, thereby reducing the amount of transformable silicon and boron carbide. The new substances formed are still lightweight and of high hardness.

It has been noted that silicon undergoes a net volume expansion of about 9 percent upon solidification. Thus, in accordance with one preferred embodiment of the present invention, by mixing or alloying the silicon with a material that undergoes a net volume shrinkage upon solidification, it is possible to produce a silicon-containing composite body having a residual infiltrant component that undergoes much less, or perhaps even substantially no net volume change upon solidification. Thus, production of silicon-containing composite bodies that exhibit neither solidification porosity nor solidification exuding of the infiltrant component can be realized.

Carbon is frequently added to the porous mass to enhance infiltration. (Unless otherwise noted, from hereon the term "porous mass" will be understood to include the term "preform") One ramification of using a multi-constituent infiltrant, however, is the change that takes place in the chemical composition of the infiltrant as it infiltrates the porous mass or preform, and specifically as the silicon constituent of the infiltrant metal reacts with the carbon contained therein to produce silicon carbide. Accordingly, the present inventors have discovered the significance and importance of keeping the reactable or "free" carbon content of the porous mass to be infiltrated at relatively low levels. Preferably, the amount of free carbon in the porous mass is kept as low as necessary to accomplish complete infiltration in a reliable manner but without unduly compromising the binder qualities of the carbon when preforms (e.g., self-supporting porous masses) are used. This way, large bodies can be infiltrated with minimal changes in the infiltrant metal's composition, thereby resulting in a silicon carbide composite body having a dispersed residual metal component of relatively uniform composition throughout the body.

The use of a multi-constituent infiltrant composition has additional advantages beyond the ability to produce composite bodies whose residual metal component has zero or near-zero volumetric change (swelling or contraction) upon solidification.

For instance, and in another major aspect of the present invention, the alloying of silicon infiltrant with one or more different elemental constituents can substantially depress the melting point of the infiltrant. Desirable alloying elements in this regard include aluminum, beryllium, copper, cobalt, iron, manganese, nickel, tin, zinc, silver and gold. The lowered melting or liquidus temperatures permit the infiltration to be conducted at lower temperatures. For example, when the infiltrant comprises a silicon-aluminum alloy, it is possible to infiltrate a porous mass comprising some elemental carbon at a temperature in the range of about 1100° to about 1300° C. By way of comparison, when the infiltrant consists essentially of silicon, the temperature must be maintained at least above the silicon melting point of about 1412° C., and often substantially above the melting point so that the melt is sufficiently fluid. One of the most important consequences of being able to operate at lower temperatures is the discovery that at the lower temperatures, the infiltration is more reliably terminated at the boundaries of the porous mass. Further, instead of having to use expensive graphite molds to support the porous mass and to confine the liquid infiltrant, cheaper materials such as a loose mass of ceramic particulate may be used. Thus, the ability to conduct infiltrations at lower temperatures gives operators more control over the process, not to mention saving time and energy.

Alloying of silicon may also help suppress unwanted by-product chemical reactions. For example, additions of a source of carbon and/or boron to silicon can help ameliorate the tendency of molten silicon to chemically react with boron carbide, a candidate reinforcement material.

In another embodiment embraced by the instant invention, the metal component of the formed composite body may be modified or tailored, specifically to substitute a different metal or intermetallic compound for silicon metal or alloy.

Still further, in the armor embodiment in particular, the instant inventors have discovered that a very desirable armor material can be produced when the known hardness requirement is combined with a relatively fine-grained microstructure. To achieve this microstructure, it may be important to minimize the extent of chemical reaction during infiltration, and also to minimize the extent of microstructural development (such as recrystallization or other fonts of sintering). Accordingly, the resulting microstructure of the instant boron carbide composite materials engineered for armor applications features filler particles of limited size, and is a microstructure of limited interconnectivity of the bodies making up the hard phase(s) provided in the porous mass or preform.

DEFINITIONS

"Areal Density", as used herein, means the mass of an armor system per unit area.

"Ballistic stopping power", as used herein, means the $V_{50}$ projectile velocity per unit of total areal density.

"Blockers" or "Infiltration blockers", as used herein, mean materials that can be used to halt the progress of infiltration of the molten infiltrant.

"Foundation" or "foundation material", as used herein, means the substantially non-infiltratable material that is used to support the components that participate in the infiltration process, such as the molten infiltrant and the porous mass to be infiltrated. These materials can be porous or not, and can be either free-flowing or self-supporting.

"Free Carbon", as used herein, means carbon that is intended to react with molten silicon to form silicon carbide. This term usually refers to carbon in elemental form, but is not necessarily limited to the elemental carbon form.

"Inert Atmosphere", as used herein, means an atmosphere that is substantially non-reactive with the infiltrant or the porous mass or preform to be infiltrated. Accordingly, this definition includes gaseous constituents that might otherwise be thought of as mildly reducing or mildly oxidizing. For example, forming gas, comprising about 4 percent hydrogen, balance nitrogen, might be considered to be an inert atmosphere for purposes of the present disclosure, as long as the hydrogen does not reduce the filler material and as long as the nitrogen does not appreciably oxidize the infiltrant or filler material.

"Mass Efficiency", as used herein, means the areal density of rolled homogeneous steel armor required to give the same ballistic performance as that of the targets of a given areal density being tested, expressed as a ratio.

"Reaction Bonded Silicon Carbide", or "RBSC", refers to a ceramic composite body produced by reaction-bonding, reaction-forming, reactive infiltration, or self-bonding.

"Reaction-Bonded Boron Carbide", or "RBBC", as used herein, means a class or subset of reaction-bonded silicon carbide composites in which the filler or reinforcement of the composite, i.e., the phase being bonded, includes boron carbide.

"Reaction-Bonding", "Reaction-Forming", "Reactive Infiltration" or "Self-Bonding", as used herein, means the infiltration of a porous mass comprising carbon in a form that is available to react with an infiltrant comprising silicon to produce a ceramic composite body comprising at least some silicon carbide produced in-situ.

"Siliconizing", as used herein, means the infiltration of a porous mass with a molten infiltrant containing silicon metal, at least the silicon constituent being substantially non-reactive with the constituents of the porous mass, to produce a composite body having a matrix containing silicon metal.

Thus, "siliconized boron carbide" refers to a composite body containing boron carbide and silicon metal, but substantially no silicon carbide formed in-situ from a reaction of the silicon metal.

"Total areal density", as used herein, means the areal density of ceramic armor material plus the areal density of any other material that should properly be considered a part of the assembly of components making up an armor system. Examples of other materials would be fiber reinforced polymeric materials frequently used to back up or encase a ceramic armor plate.

"$V_{50}$", as used herein, refers to the velocity of a ballistic projectile at which the projectile has a 50% probability of penetrating an armor.

BRIEF DESCRIPTION OF THE FIGURES

FIGS. 4A and 4B are optical photomicrographs of polished cross-sections of non-heat treated, and heat-treated RBBC, respectively.

FIGS. 9A and 9B are optical photomicrographs of polished cross-sections of unmodified and titanium-modified RBBC, respectively.

FIGS. 10A and 10B are optical photomicrographs of polished cross-sections of "standard" and very fine-grained (10 micron maximum) RBBC, respectively.

DETAILED DESCRIPTION OF THE INVENTION

Figure 1:
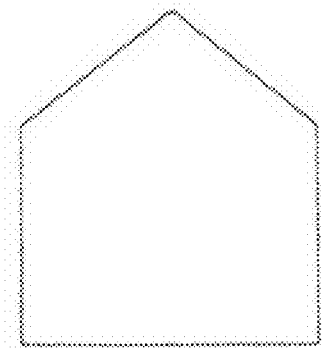
FIG. 1 is a cross-sectional view of a feeder rail as described in Example 1.

In accordance with the present invention, a substantially pore-free, mechanically strong composite material is produced that contains boron carbide, preferably in a large volume fraction or combined with one or more exceptionally hard, stiff materials such as silicon carbide to yield a large fraction of very hard, very stiff material as the reinforcement component of the composite. Furthermore, through careful control of the processing conditions, e.g., to suppress reaction of the boron carbide phase, a superior material can be produced, particularly a superior armor product. In addition, the composite bodies produced according to the present invention maintain dimensional tolerances upon thermal processing better than do hot pressed and sintered bodies.

As stated above, silicon carbide and boron carbide, two candidate materials having very desirable hardness for certain applications envisioned by the instant invention, are difficult to fully densify by traditional approaches such as by sintering. Such materials are amenable to hot pressing, but hot pressing has its drawbacks, for example, its expense and limitations of the possible geometries that can be produced without extensive machining.

Thus, for economy and manufacturing flexibility, among other reasons, the composite bodies of the instant invention may be produced by a reactive infiltration technique, usually termed "reaction forming" or "reaction bonding", whereby a molten infiltrant comprising silicon is contacted to a porous mass comprising carbon and at least one hard ceramic material that includes boron carbide. The molten silicon-based material infiltrates the interconnected porosity in the porous mass or preform. The molten silicon contains one or more sources of boron in a quantity sufficient to attenuate the tendency of the boron carbide component to chemically react with the molten silicon. Particularly preferred is when the molten silicon also contains one or more sources of carbon, whose presence also appears to help suppress this chemical reaction. Concurrent with the infiltration, the silicon reacts with the carbon in the porous mass or preform to form silicon carbide, which silicon carbide typically has the "beta" SiC polymorph. The amount of infiltrant is generally provided in such a quantity that the carbon in the porous mass or preform is completely reacted to silicon carbide, with sufficient additional infiltrant supplied to fill any remaining void space between the filler material and the in-situ silicon carbide. The resulting composite materials feature a matrix of the in-situ silicon carbide. Dispersed throughout the matrix is the filler and residual, unreacted infiltrant material. As the residual infiltrant is often interconnected, it is sometimes considered as part of the matrix of the composite.

In terms of the preferred processing conditions, atmospheres that are compatible with this type of infiltration include vacuum or inert atmospheres or mildly reducing atmospheres such as argon, helium, forming gas or carbon monoxide, although vacuum is preferred, at least from the standpoint of facilitating the reliability or robustness of infiltration. The vacuum does not have to be "hard" or high vacuum; that provided by a mechanical "roughing" pump is entirely adequate. Although the infiltration tends to be more robust at the higher temperatures, it is also more aggressive, which could give rise to unwanted side reactions, particularly of the boron carbide component. Further, it is more difficult to confine the infiltrant spatially at higher temperatures. Moreover, higher processing temperatures are more likely to give rise to exaggerated grain growth. For all of these reasons, the preferred processing temperatures are those that are generally low yet consistent with reliable infiltration. For infiltrating silicon-based metals into a boron carbide-containing particulate mass in a rough vacuum environment, temperatures in the range of about 1450° C. to 1600° C. should be satisfactory Boron carbide is an especially attractive filler material candidate where the mass of the article is of concern because of its low theoretical density of about 2.45 to 2.55 grams per cubic centimeter. (The range in reported theoretical density may be due to the fact that boron carbide is not a line compound per se, but instead exhibits a limited range of stoichiometry.) Because the Young's Modulus of boron carbide is comparable to that of silicon carbide (about 450 GPa), boron carbide has a higher specific stiffness than does silicon carbide. High specific stiffness is a valuable property in applications such as those requiring precise motion and control of motion, especially where large loads or high accelerations are involved. Moreover, boron carbide is even harder than silicon carbide. Thus, a RBSC composite body featuring boron carbide as a reinforcement or filler material (i.e., "RBBC") may offer higher hardness yet lower specific gravity as compared to a RBSC composite having silicon carbide as the filler material.

In an alternate embodiment, the instant invention includes boron carbide composites made by a "siliconizing" process, similar to the process to make "siliconized. SiC". Here, a molten infiltrant comprising silicon, usually commercially pure elemental silicon, is contacted to a porous mass of ceramic material, including at least some boron carbide, that is wettable by the molten infiltrant under the processing conditions, which is generally taken to be a vacuum or inert gas (e.g., argon) environment. The ceramic material containing the boron carbide can be in the form of substantially non-connected particles such as a loose mass of particulate, or may be in the form of a lightly sintered or "bisque-fired" material, or may be heavily sintered, with only a small amount of interconnected porosity. Unlike the RBSC process, here the source of carbon in the porous mass is substantially lacking. Thus, siliconizing is not as robust an infiltration process as is the RBSC process. Accordingly, somewhat higher infiltration temperatures may be required, such as between about 1500° C. to about 2000° C. and/or a vacuum environment (as opposed to inert gas environment, for example) may be required. For making siliconized boron carbide for armor applications, however, the present inventors recommend that the higher infiltration temperatures and the heavier sintering of preforms (e.g., making the filler bodies more interconnected) should probably should be avoided, for reasons that will be discussed in more depth to follow.

An aspect of the instant invention relates to the specific application of the instant boron carbide composite materials as armor for stopping ballistic projectiles. To defeat the incoming projectile, such ceramic armors usually feature at least two layers made up of very dissimilar materials. Namely, such a component of a ballistic armor system features, at a minimum, a ceramic layer and a backing layer, which typically are bonded to one another. As the name suggests, relative to the direction of travel of the projectile, the backing layer is placed behind the ceramic layer. Sometimes, one or more layers of a protective material are also placed in front of the ceramic layer, but these are usually for the purpose of protecting the ceramic from fractures due to routine handling (or mishandling). The purpose of the ceramic layer is to "process" the impinging projectile, such as by flattening, shattering, eroding it, etc. The role of the backing layer is to then "catch" the processed projectile as well as any backward propelled fragments of the ceramic layer. Typically, the backing layer can deform to a large degree without failing catastrophically. The backing layer may be made of metals or alloys such as aluminum, iron or steel, titanium, etc., which for vehicular armor, may be the structure of the vehicle itself. Where lightweight armor is needed, the backing layer typically is a fiber-reinforced polymeric (FRP) material. The fibers employed in these backing layers include polyethylene, aramid and glass fibers. A well-known FRP backing material goes by the tradename "SpectraShield", registered to AlliedSignal Inc. (now owned by Honeywell International Inc., and referring to a roll product consisting of two plies of unidirectional extended-chain polyethylene fiber tapes cross-plied at right angles, resulting in a nonwoven, thermoplastic composite); however, several such FRP backing materials are commercially available.

Armor generally takes the form of a plate, but the plates need not be flat, regular polygons. Often, the armor plates must be shaped to conform to the underlying structure to be protected. Body armor, for example, is often curved in one or more dimensions to better conform to the shape of the wearer, e.g., conform to a human torso.

According to many who are skilled in the armor arts, what is sought in the way of an armor material is one that fractures and erodes the impacting projectile before it can penetrate the armor system. Viechnicki et al. (ibid.) have shown that all that is required in terms of hardness is for the armor to have at least the same hardness as the projectile, but that further increases in hardness over the required "threshold" level do not add significantly to the performance level.

Accordingly, in addition to the motion control applications alluded to above, boron carbide composites should be attractive candidate armor materials, and in fact as the prior art shows, others have attempted to apply boron carbide composite materials as armors previously. Because armor is often specified by total weight, armor systems having low bulk density are sought after because the armor can be made thicker for the same mass, the desirability of which was discussed previously. One implication of the extreme hardness of boron carbide is that a greater amount of non-hard phase, e.g., metal, can be tolerated in a composite body comprising boron carbide and metal, for example, to enhance other properties such as strength or toughness, and still meet the overall hardness required of the composite body.

The overall hardness of the boron carbide composite material of the instant invention is proportional to the hardnesses of the constituents of the composite material, and to their volumetric proportions. In terms of developing a high-performing armor material, this armor embodiment of the instant invention focuses on achieving a sufficiently high volumetric loading of the hard ceramic phases such as boron carbide as to meet overall hardness levels believed to be important, and on limiting the size of the largest grains or crystals, particular the ceramic crystals, making up the composite body. To state it more precisely, substantially all of the morphological features making up the microstructure of the boron carbide composite body should be smaller than about 350 microns in size. More preferred is that substantially all of these features be smaller than about 212 microns; still more preferred is that at least 90 percent by volume be less than about 100 microns in size. Particularly preferred is for the boron carbide composite body having at least 90 volume percent of its ceramic morphological features being no greater than about 55 microns in size.

Such an upper limit to the particle size of the filler materials used in the porous mass or preform can be achieved, among other techniques, by sieving the filler bodies. For example, a 170 mesh and 200 mesh (U.S. Standard) screen yields particles having a maximum size of about 90 microns and 75 microns, respectively. Similarly, 45 mesh, 50 mesh and 70 mesh (U.S. Standard) sieve screens pass particles having a maximum size of about 350 microns, 300 microns and 212 microns, respectively. Even more preferred is for the boron carbide composite body having at least 90 volume percent of its morphological features being no greater than about 55 microns in size.

One technique for maximizing the amount of hard phase in the composite body is to produce a porous mass or preform that is highly loaded volumetrically in the hard phases, typically in the form of filler materials having high hardness. Highly loaded preforms can be produced by utilizing a distribution of filler material particle sizes sufficiently wide so that small particles can nest or fit within the interstices of larger particles. Because these two parameters of maximizing the loading of hard fillers in the preform while capping or limiting the size of the largest particles inherently are at odds with one another, careful attention to processing parameters is required to achieve both in the same material. Fortunately, the instant inventors have been relatively successful in attaining preforms highly loaded in hard filler while limiting the size of the filler bodies in such a way that, for example, at least 90 percent by volume are smaller than about 100 microns in diameter. Even with this more conservative upper limit of about 100 microns on the size of the largest particles, it is still possible to produce preforms that are 65 volume percent or more loaded in hard ceramic phases such as SiC and/or $B_4C$.

Some of the "larger" hard ceramic fillers used in the Examples to follow have the following particle size distributions: Grade F240 CRYSTOLON® SiC (Saint-Gobain/Norton Industrial Ceramics, Worcester. MA) has 90 percent by volume of all of its constituent particles being smaller than about 55 microns, and 97 percent smaller than about 70 microns. Grade F320 CRYSTOLON® SiC has 90 volume percent of its particles being smaller than about 37 microns, and 97 percent finer than about 49 microns. These results were calculated based on the Eppendorf-Photosedimentometer. According to sieve analysis, 220 grit TETRABOR® $B_4C$ (ESK, Kempten, Germany) has 85 volume percent of its particles being smaller than about 75 microns, and substantially all of its constituent particles being smaller than about 106 microns.

It may be that limiting the fine grain size as specified by the instant invention is really a proxy for high mechanical strength, or at least for placing a lower limit on mechanical strength of the composite material. Because limiting the grain size is a necessary but not a sufficient condition for achieving high strength in brittle materials, achieving a high strength target traditionally has been taken as something of a metric for the quality of the ceramic or composite body produced. With brittle composite materials in general and brittle composite materials produced by infiltration in particular, a number of defects can seriously impair the mechanical strength of the resulting composite body. These include non-uniform filler material distribution in the preform, incomplete infiltration of the preform, e.g., leaving porosity and/or unreacted carbon or other reactants in the preform, and excessive grain growth during thermal processing, either of the filler material or of any silicon carbide produced in situ. Such defects probably would also impair the anti-ballistic performance of the material.

It may be the case that the microstructures of the boron carbide composite materials of the instant invention result in fracture in a different (e.g., transgranular versus intergranular) mode than do the prior art composite bodies made by silicon infiltration techniques that have the larger, more interconnected microstructures. Whatever the exact reason or operative mechanism, the instant inventors have discovered that RBBC materials of limited grain size and limited connectivity of the ceramic phase(s) are very effective at stopping ballistic projectiles, particularly from small arms fire.

Because the hard filler component of the boron carbide composite bodies of the instant invention is so much harder than the silicon component (Knoop Hardness of about 2900-3580 $kg/mm^2$ for $B_4C$, for example, versus about 1100 $kg/mm^2$ (Vickers) for Si, respectively), the overall hardness of the composite body is strongly dependent upon the relative amounts of each phase. Thus, when the end-use article of the instant composite material is armor for protection against ballistic projectiles, it may be important that the composite body contain a large volume fraction of the hard phase(s), particularly where the residual infiltrant phase component is softer than silicon, a scenario that will be discussed in more detail below. In a reaction-formed silicon carbide composite material, some silicon carbide is produced in situ. Thus, it is possible to form a composite body that is highly loaded in silicon carbide by infiltrating silicon into a porous mass containing large amounts of carbon. For reasons that also will be discussed in more detail below, this approach is not preferred. Instead, what is desired is to reactively infiltrate a porous mass or preform that is highly loaded not with carbon but rather with the hard ceramic phase(s) of the filler material(s). In an alternate embodiment, a preform highly loaded with hard filler materials but little or no reactable carbon is infiltrated with molten silicon (e.g., "siliconizing") or silicon-containing metal.

Techniques for maximizing the volumetric loading of filler materials in the porous mass or preform are well known, and usually take the form of blending a plurality of filler material bodies, for example, particles, having a distribution of sizes in such a way that smaller particles tend to fill the interstices between larger particles. There are limits to the size distribution, however, to the extent of distribution of particle sizes. For example, where there is a potential for chemical reaction, as there is for boron carbide in these silicon infiltration systems, smaller particles tend to be more reactive than larger particles due to their large total surface area. At the other end of the scale, at some point, large-sized filler material particles will begin to reduce the strength of a composite body that fails by a brittle fracture mechanism due to the introduction of critical-sized flaws into the material. Further, whether it is strength-related or not, there is anecdotal evidence in the prior art that RBSC bodies containing large or relatively large grains were not superior armor materials. Accordingly, the instant invention overcomes this problem by providing a technique whereby the relatively fine boron carbide particles can be infiltrated in a reaction-bonding operation, and not be consumed in a reaction with the incoming silicon infiltrant. The ability to make a fine-grained RBBC is not only beneficial for armor applications, but also for many precision equipment applications. Specifically, while the higher strengths afforded by the fine grain size composite material may not be essential, the fine grain size permits finer features to be ground or machined into the material.

Although most any of the known techniques may be employed to produce a porous preform that can be infiltrated by a molten infiltrant comprising silicon, the techniques that seem to be better able at producing preforms, particularly relatively thin preforms, that are highly loaded with one or more fillers are those that utilize a liquid phase, for example, sediment casting, slip casting or thixotropic casting. But other well-known ceramic processing techniques such as dry pressing may also be entirely satisfactory, depending on the particulars of the composition and article being formed.

The ability of silicon infiltration technologies, or more particularly, the discovery of processing parameters pertaining to silicon infiltration technology that permit the fabrication of large structures of complex shape provides guidance in the selection of a preforming technique that can best take advantage of this potential. Specifically, fulfilling the potential of silicon infiltration technology tends to drive the preforming selection process away from preforming techniques such as dry pressing or injection molding, which are good for high volume production, but generally only of relatively small parts, in part because the pressing or injection pressures that are needed tend to be high. A complex shape requirement then tends to drive the preform processing away from techniques such as tape casting or extrusion, as these tend to used for making preforms that are flat or sheet-like, or of uniform cross-section, respectively. A requirement for relatively high loading of the preform, e.g., filler or reinforcement material, tends to drive the preform processing away from techniques such as compression molding. This technique may be thought of as a low-pressure form of dry pressing, and as with dry pressing, it is not generally conducive to high loading.

Among the preform processing techniques remaining are slip casting, gel casting, sedimentation casting and thixotropic casting, and their variations. Slip casting requires plaster or otherwise porous molds, which must be dried before re-use, which takes time. Thus, slip casting is difficult to use in high volume production. Slip casting also requires the use of a stable slip, so there are limits on how large the particles are that one can use before it becomes impossible to keep them suspended in the liquid. This in turn limits the particle loading that can be achieved.

Thus, one can consider thixotropic casting and sedimentation casting. Thixotropic casting has been around for several decades but is still not that well known. Some consider it a version of slip casting. Like slip casting, the particles should be deflocculated. Unlike slip casting, however, the amount of colloidal sized particles should be kept low in thixotropy casting; otherwise it can be difficult to "break" the thixotropy and achieve a fluid condition. Another difference is that in thixotropic casting, the particles used can be quite coarse. Very little liquid is used; the powder seems merely to be damp. However, it exhibits extreme thixotropy, and will flow under applied vibration. Thus, the damp powder is placed into a mold, which may be porous or not, and the mold and its contents are subjected to vibration. The powder shows slurry-like behavior and flows and fills the mold. Very little liquid remains to mop up. When vibration is ceased, the slurry becomes so viscous due to its very high solids loading that it ceases flowing. A binder is often employed, but only a small quantity is usually needed. The very high solids loading can be achieved, for example, by employing an Andreasen particle size distribution.

Thixotropic casting, however, can leave large defects such as large pores in the preform. These can be cause by the formation of air bubbles in the slurry, which can be difficult to remove, or prevent forming, even with appropriate deflocculants and wetting agents. When carried out correctly, sedimentation casting can obviate such problems with large defects. Like thixotropic casting, sedimentation casting has been around for decades, but it is little known and not much used. In sedimentation casting, a slurry of particles in a liquid is poured into a nonporous mold. Unlike a slip, the particles are not maintained in suspension, typically because they are too large or too dense. Thus, they settle out of suspension, leaving predominantly liquid (typically aqueous solution) at the top of the mold, and a sediment of the particles throughout the rest of the mold. Optional vibration of the mold and its contents helps the particles fill out the mold space, and helps smaller particles nestle between larger particles to maximize packing density. The liquid may be removed periodically over the course of settling, and additional slurry may be added as needed to fill up the mold. Although particle size and/or density gradients may be desirable in some applications, usually what is wanted is a preform that is as homogeneous as possible. Since the settling particles are subject to Stokes' Law, particle segregation is a potential problem with sedimentation casting. However, if the slurry is highly loaded and not made too fluid, the particles will settle very little before they begin to pack. Thus, the segregation problem can be mitigated. When the particles have finished settling, the sediment is made rigid ("rigidified") to permit demolding and subsequent handling of a self-supporting preform. One such rigidifying technique is to freeze the mold and its contents. The sediment contains some residual liquid, and upon freezing, it holds the particles of the sediment together. Another rigidifying technique is to add a binder, or a substance that can operate as a binder, to the slurry. The binder may be soluble in the liquid. Upon drying the sediment in the mold, for example, by placing the mold and its contents in a drying oven, the binder comes out of solution and is activated, e.g., cross-linked, thereby providing binder qualities.

Both thixotropic casting and sedimentation casting can be extremely useful preforming tools used in conjunction with silicon infiltration processing for producing silicon composites of large, complex shape that are highly loaded in reinforcement. Thixotropic casting can use an even wider or larger particle size distribution than can sedimentation casting, since particle size segregation is hardly an issue. However, where defect size is an issue, for example, in achieving certain surface finish or certain mechanical strength targets, sedimentation casting may be preferred over thixotropic casting.

Non-porous molds for thixotropic or sedimentation casting should be chemically inert to the slurry constituents, relatively lightweight, readily cleanable, and sufficiently rigid to preserve the dimensional precision of the casting. Aluminum alloy meets these requirements. For complex shapes, the mold may need to be provided in two or more pieces that fit together and are held together. It can be difficult to achieve such a precision fit in aluminum, particularly after the wear and tear of repeated use in a production environment. Accordingly, a means for sealing the mold pieces, such as a gasket such as o-ring material, may be employed. A groove or channel in one or more mold pieces may be provided to house the gasket material. The mold pieces may be held together by any means known in the art—clamps, nuts & bolts or other similar fasteners, rubber bands, etc. In another embodiment, metal molds may not provide the casting shape, but instead are lined with rubber or other elastomeric, non-porous material, such as P-45 silicone rubber (Silicones, Inc, High Point, N.C.). This approach may lose something in precision of the shape, but it reduces weight, may assist in cleaning and re-use of the mold, and if the molding surface becomes damaged, it is less expensive to replace the rubber insert than the entire metal mold. It also obviates the need to perform precision machining of the metal to make the casting surfaces. A mold release agent such as Stoner E408 Dry Film Mold Release (Stoner, Inc., Quarryville, Pa.) may be spray coated on the casting surfaces to assist in demolding the cast preform.

Another shape-making technique that is useful for making large complex preform shapes is that of gel casting, sometimes referred to as "gelation casting". Here, the ceramic reinforcement is mixed with a monomer, which may be dispersed in a solvent, to make a slurry. The slurry is cast into a mold, which is generally nonporous. Then, the monomer is cross-linked while the slurry is still in the mold, thereby solidifying the preform. There are both aqueous and non-aqueous casting systems, although the aqueous systems may be preferred from the environmental standpoint, as well as being more familiar to preform makers. In the aqueous system, the monomer may be monofunctional acrylamide and/or difunctional N,N'-methylenebis-acrylamide, which are typically dispersed in water about 5% to 20% by volume. The crosslinking agent for these systems can be ammonium persulfate.

At first glance, the embodiments discussed above for making improved silicon-containing composite structures such as RBBC may seem distinct and unrelated to each other. But they are, or can be, related. For instance, the need to produce large, unitary structures can be addressed in part by alloying the silicon infiltrant. It can also be addressed in part by minimizing the amount of chemical reaction that takes place during the infiltration process. In turn, this can be addressed by minimizing the amount of free carbon in the preform, which is also assisted by maximizing the reinforcement loading in the preform. And it is also assisted by minimizing the processing temperature, which in turn is assisted by alloying the silicon to produce a eutectic. Maximizing preform loading can be accomplished by using a molding technique such as sedimentation casting or thixotropic casting. Thus, there is a special relationship, almost a synergistic effect, between certain preforming techniques such as thixotropic or sedimentation casting, and the ability to achieve the potential shape-making capability of silicon infiltration processing. Additionally, larger bodies may now be produced with less risk of cracking due to expansion of the silicon phase within the composite during cooling through its solidification temperature In one embodiment that is particularly useful for making hollow composite bodies, or at least a composite body having a shaped interior surface, the solid body of infiltrant metal may be shaped, for example, by machining, and then the porous mass to be reactively infiltrated is contacted to at least a portion of that shaped surface of the infiltrant metal. When the infiltrant metal infiltrates the porous mass, that portion is reproduced in opposite or inverse form in the formed silicon-containing composite body. For instance, if the shaped infiltrant metal is substantially completely covered with the material of the porous mass, the resulting composite body is hollow, and whose interior surfaces are the inverse or opposite shape of the infiltrant metal. That is, if the shaped body of infiltrant metal still existed, it could be fit with the formed composite body like two jigsaw puzzle pieces. The thickness of the formed composite body here may be regulated by the amount or thickness of porous material brought into contact with the infiltrant metal, and by the amount of infiltrant metal available for infiltration.

Whereas previously producers of silicon infiltrated composite materials were resigned to having to perform grinding or machining post-infiltration, the new reality is that such final grinding/machining can be greatly minimized, even eliminated in some cases. Thus, this operation, to the extent that it needs to be performed at all, can now be performed before silicon infiltration, when the porous mass is still in the preform stage. This "green machining" is considerably easier and faster than grinding or machining a dense composite body. However, the present inventors recognize that in order to obtain precision and fine detail at this stage, the size of the bodies making up the reinforcement component of the preform may need to be limited. This is because, unlike final grinding/machining, green machining tends to remove the bodies in their entirety, rather than remove portions of them. In other words, the limit of machining detail at the preform stage is limited by the surface finish that can be imparted to the preform, which in turn is controlled by the size of the bodies making up the preform. The present inventors have found it desirable that substantially all preform reinforcements, e.g., particulates, flakes, etc., be less than about 200 microns in size, and preferably at least 90 percent by volume be smaller than about 100 microns, and even more preferred that at least 90 volume percent be smaller than about 50 microns in size. For instance, the preform that was green machined in Example 5 featured particulate whose median size was about 13 microns.

Again, an embodiment of the instant invention includes providing an auxiliary constituent to the silicon-based constituent to effect a property or processing modification. Recently, it has become known to alloy the infiltrant metal used to make a reaction-formed silicon carbide body so that the metal phase of the formed body includes a constituent other than silicon. (See, for example, commonly owned U.S. Pat. No. 6,503,572.) This ability extends to the instant boron carbide composite system, where the infiltrant may comprise an alloy of silicon, boron and copper to yield a phase in the formed boron carbide composite body comprising metallic copper or copper alloy or a copper-silicon intermetallic compound. Such bodies containing an alloy infiltrant phase often are softer but tougher than similar bodies having essentially pure silicon as the infiltrant phase. In spite of the hardness reduction, reaction-bonded boron carbide composites having an alloyed infiltrant phase might still function well as armor materials. For example, the property of compressive strength or toughness may be an important factor contributing to good anti-ballistic character, particularly when combined with high hardness. For example, enhanced toughness might contribute to improved multi-hit capability of the resulting armor product, and/or might contribute to enhanced durability which is important even for routine handling in the field. The siliconizing process should also be amenable to the addition of other (non-silicon) metals to the infiltrant.

In this aspect of the invention, a porous mass containing at least one reinforcement material that includes boron carbide and optionally carbon is infiltrated with a molten, multi-constituent metal containing silicon. Typically, a wetting condition exists or is created between the molten metal and the bodies of material making up the porous mass so that the infiltration can occur by capillarity. Although possibly modified somewhat compositionally, typically some infiltrant metal remains in the infiltrated body, and distributed throughout the composite body and distributed throughout the one or more reinforcement materials.

The present invention encompasses placing one, several or all of the constituents of the multi-component infiltrant within the porous mass to be infiltrated, or at an interface between the mass and an adjacent body of the infiltrant metal. Preferably though, the constituents of the infiltrant material are provided as an alloy, possibly in ingot or other bulk form, that is then brought into contact with the porous mass to be infiltrated. The infiltrant metal may be placed into direct contact with the porous mass to be infiltrated, or the infiltrant metal may remain substantially isolated from the porous mass, with a wicking means interposed between the two to create a pathway or conduit for the molten infiltrant metal to migrate toward and into the porous mass. The wicking means could be most any material that is wet by molten infiltrant metal, with silicon carbide being preferred.

In one embodiment, the present invention contemplates producing in-situ silicon carbide. Accordingly, the porous mass or preform to be infiltrated contains free carbon, and at least one constituent of the multi-constituent infiltrant material is silicon. The other constituent(s) may be any that are capable of producing some desirable effect during processing or on the final character or properties of the resulting composite body. For example, the non-silicon constituent(s) may give rise to an alloy having a lower liquidus temperature than the melting point of pure silicon. A reduced liquidus temperature might then permit the infiltration to be conducted at a lower temperature, thereby saving energy and time, as well as reducing the tendency for the infiltrant to over-infiltrate the boundaries of the preform or porous mass into the supporting materials. Moreover, a non-silicon constituent infiltrated into the porous mass along with the reactive silicon constituent may produce superior properties of the resulting composite body—enhanced strength or toughness, for instance. Further, a non-silicon constituent so infiltrated may also counteract the expansion of the silicon phase upon solidification, a desirable result from a number of standpoints, as will be discussed in more detail later. Elemental non-silicon constituents that fulfill one or more of the advantageous attributes include aluminum, beryllium, copper, cobalt, iron, manganese, nickel, tin, zinc, silver, gold, boron, magnesium, calcium, barium, strontium, germanium, lead, titanium, vanadium, molybdenum, chromium, yttrium and zirconium. Still further, a non-silicon constituent raises the possibility of being able to tailor one or more properties of the resulting silicon-containing composite body, such as CTE or thermal conductivity; by adjusting the kind and proportion of the constituents of the infiltrant metal.

One such metallic constituent that has been identified as fulfilling these three desirable attributes is aluminum. The present inventors have observed that a silicon-containing composite body that also contains some aluminum-containing phase is substantially tougher than a silicon-containing composite containing residual, unreacted silicon. Still further, the present inventors have discovered that when the residual infiltrant component of the composite body comprises about 40 to 60 percent by weight silicon and 60 to 40 percent aluminum, the volume change of the residual infiltrant phase is practically zero. In a particularly preferred embodiment, a preform containing silicon carbide particulate and about one to several percent by weight of carbon may be readily infiltrated in a rough vacuum at about 1100° C. with an infiltrant alloy containing roughly equal weight fractions of silicon and aluminum to produce a composite body containing silicon carbide plus residual alloy having a composition of about 40 to 45 percent by weight silicon, balance aluminum. In addition, the present inventors have discovered that at this lower infiltration temperature of about 1100° C., a loose mass of silicon carbide particulate can be used to support the porous mass or preform to be infiltrated without itself being infiltrated by the molten infiltrant. This discovery greatly simplifies the furnacing operation and obviates the need for expensive graphite fixturing and tooling.

The ability to toughen silicon-containing composite bodies through additions to the silicon infiltrant has important beneficial consequences. For instance, previously, the preferred approach to toughen these rather inherently brittle materials was to add a fibrous reinforcement to the composite. But this approach has a number of drawbacks. Long fibers are not very amenable to ceramic processing requiring stirring. Short fibers may pose a respiration hazard. The presence of fibers may degrade the surface finish that can be achieved during green machining, particularly if the fibers are added in the form of bundles, which is a popular approach in the prior art. For the toughening to be realized, the fibers should debond and pull out of the surrounding matrix. Often, one or more coatings must be applied to the fibers to achieve this effect, which adds to cost and complexity of the system. Coated fibers often have to be treated gently during processing, lest the coatings be damaged, and this would likely eliminate certain processing techniques such as Muller mixing or ball milling. Thus, the ability to toughen silicon-containing composites without reliance on fiber additions is significant.

In general, the temperature at which the infiltration is conducted is the lowest at which infiltration occurs quickly and reliably. Also, in general, the higher the temperature, the more robust is the infiltration. Unnecessarily high infiltration temperatures are not only wasteful in terms of energy costs and the extra heating and cooling time required, but the more likely it is that undesired "side" reactions can occur. A number of ceramic materials that are usually thought of as being inert and uninfiltratable at moderate temperatures (e.g., aluminum oxide, boron nitride, silicon nitride) can lose their inert character or are infiltrated by silicon at elevated temperatures (e.g., about 1500° C. and above), particularly under vacuum. Thus, it becomes quite a challenge to house or support a porous mass to be infiltrated and to minimize the degree of over-infiltration into the supporting material, or reaction therewith. Such over-infiltration typically results in the over-infiltrated material being bonded to the infiltrated mass, necessitating costly grinding or diamond machining for its removal. Another problem with unnecessarily excessive infiltration temperatures is that the non-silicon constituent(s) may have a higher vapor pressure than the silicon constituent, with the undesirable result that such constituent is readily volatilized out of the infiltrant alloy, changing the overall infiltrant chemistry and contaminating the furnace.

It has been noted that silicon undergoes a net volume expansion of about 9 percent upon solidification. Thus, in accordance with another important aspect of the present invention, by alloying the silicon with a constituent such as a metal that undergoes a net volume shrinkage upon solidification, it is possible to produce a composite body whose residual infiltrant material within the composite body undergoes substantially no net volume change upon solidification. Thus, the production of silicon carbide composite bodies that exhibit neither solidification porosity nor solidification exuding of metal phase can be realized.

The particularly preferred alloying element of aluminum by itself exhibits a solidification shrinkage of some 6.6 percent by volume. Under the preferred conditions (for a silicon carbice, not a boron carbide-based system) of a vacuum environment and a silicon carbide porous mass containing interconnected free carbon, infiltration can be achieved using infiltrants ranging from about 10 percent by weight silicon up to substantially 100 percent silicon. Accordingly, the residual infiltrant component of the formed silicon carbide body may range from nearly 100 percent aluminum to substantially 100 percent silicon. Thus, the volumetric change of the residual infiltrant material upon solidification can be tailored with infinite variability between about negative 6.6 percent (for pure aluminum) and about positive 9 percent. Although it is advantageous to reduce solidification shrinkage, say for example to negative 2 or negative 1 percent, it is highly desirable and highly advantageous to reduce solidification swelling from positive 9 percent to perhaps positive 7, positive 5 or positive 3 percent, or less. These results should also be applicable to preforms containing at least minor quantities of boron carbide.

Even if a silicon-metal infiltrant composition is used that exhibits overall net solidification shrinkage, with thoughtful lay-up design of the assemblage of preform, infiltrant material and support material, the solidification porosity that often results from this shrinkage largely can be avoided. For example, one could provide infiltrant material in excess of the minimum needed to fully infiltrate the preform, in other words, a "reservoir" of infiltrant supplying the mass to be infiltrated. The assemblage is then designed such that the last region to freeze in the composite body is supplied with molten infiltrant material from outside the body. In this way, any solidification porosity occurs outside of the composite body. Sometimes directional solidification of the composite body is employed to accomplish this desired result.

The opposite problem actually is more frequently encountered where silicon infiltrations are concerned: where the infiltrant expands upon solidification, and the composite body cannot hold the extra volume of material. The composite body thus exudes the (now) excess infiltrant. The exuded silicon may manifest itself as droplets or beads on the surface of the composite body, and often strongly bonded thereto.

This nuisance material may have to be removed by grinding or grit blasting, with the concomitant risk of damaging the attached composite body. Also, it would be desirable to not have to undertake this extra manufacturing step.

An even more serious consequence of the solidification swelling of the silicon constituent is possible swelling of the entire composite structure, thereby complicating efforts to produce net-shape parts. Still worse is the risk that such solidification swelling will cause cracking of the composite body, a risk which increases as the size of the composite body increases.

Thus, the ability to reduce or even eliminate this solidification expansion of the silicon constituent of the infiltrant material by alloying or mixing the silicon with a material that shrinks upon solidification represents an important advance in the field of silicon-containing composite materials. Not only may such composite bodies be made more dimensionally accurate in the as-infiltrated condition, but may be produced without requiring an extra process step to remove the exuded silicon.

In addition to the boron carbide or its reaction products, the porous mass can incorporate one or more other such filler materials. By this is meant a filler material that is substantially non-reactive with the molten infiltrant under the local processing conditions. Candidate filler materials (sometimes referred to as "reinforcements") for use in the present invention would include the carbides such as SiC, $B_4C$, TiC and WC; the nitrides such as $Si_3N_4$, TiN and AlN; the borides such as $SiB_4$, $TiB_2$, and $AlB_2$; and oxides such as $Al_2O_3$ and MgO. The form of the reinforcement may be any that can be produced, for example, particulate, fiber, platelet, flake, hollow spheres, etc. The individual reinforcement bodies may range in size from under a micron to several millimeters, such as about 5 millimeters, with sizes ranging from several microns to several hundred microns being common. To best produce the preferred microstructure, the inventors prefer the form of the reinforcement to be individual, separate bodies such as particles, but in an alternative embodiment also embraced by the present invention, the reinforcement can be in reticulated, skeletal or otherwise interconnected form.

Many of the above-mentioned materials are not intrinsically infiltratable by silicon-containing melts under reasonable infiltration conditions. Thus, some of these materials might be candidates as the foundation or infiltration blocker materials, to be described in more detail later. However, by applying a coating material that is wettable and/or reactive with the silicon-containing infiltrant material, for example, carbon, at least some degree of infiltration into these materials usually can be achieved.

Porous masses containing one or more reinforcements may range appreciably in terms of their packing or theoretical density. For example, a porous mass comprising flakes, disorganized fibers, or a reticulated structure may be only 5 to 10 percent dense. At the other extreme, a sintered preform may be 85 to 95 percent dense. Infiltration, however, at least that using a bulk molten infiltrant, requires at least some of the pores of the porous mass be interconnected and contiguous to the exterior of the mass; closed pores cannot be infiltrated. Moreover, the choice of processing used to fabricate the preform can influence the packing density, as processing that uses a liquid phase in general packs more densely than does a technique that does not use a liquid vehicle, such as dry pressing. Thus, if nominally monosized reinforcement bodies can be dry pressed to densities of about 30-55 vol %, then slip or sediment cast preforms might be about 40-65 vol % loaded. However, reinforcement bodies having different sizes may be blended together, for example, to increase particle packing. Thus, such dry pressed preforms might be about 35-65 vol % loaded, and those cast using a liquid phase such as slip casting might be about 45-70 vol % loaded, and sediment cast or thixotropic cast preforms might be about 45-75 or 80 vol % loaded, or possibly even as high as about 85 vol %, depending upon the specific parameters. As can be seen, preform loading is very flexible and can be engineered to a high degree Even when the reinforcement includes silicon carbide, especially in particulate form, it is still possible to distinguish a silicon carbide matrix that is reaction-formed from the silicon carbide making up the reinforcement or filler material. Specifically, the reaction-formed silicon carbide typically is of the beta polymorph, at least under the instant processing conditions, e.g., relatively low processing temperatures. In contrast, most commercially available silicon carbide, particularly the commodity grades, is the alpha (i.e., high temperature) form that is so commonly used as a reinforcement material. Accordingly, analytical techniques known to those in the art, such as x-ray diffraction, can distinguish between the two forms and can provide at least approximate quantitative data as to the relative amounts of each that are present in the composite body. However, if the infiltration is conducted at high temperature, or if the composite body is post-processed at high temperature, e.g., above about 2000° C., the beta polymorph transforms irreversibly to the alpha form, making the in-situ SiC indistinguishable from the reinforcement SiC on this basis.

Although not required, a carbon source that may be added to the porous mass or preform usually can desirably take the form of elemental carbon, such as graphite, carbon black or lampblack. Thus, the carbon may be in crystalline or amorphous form. The form of the carbon component can become significant, however, when attempting to infiltrate reinforcements that are normally difficult to infiltrate, e.g., the oxides. While carbon in particulate form may be satisfactory for infiltrating a mass of silicon carbide, other reinforcements may necessitate that the carbon be reticulated or forming a network or skeletal structure. Especially preferred is carbon in the form of a coating on the reinforcement bodies. Such a form of carbon can be achieved by introducing the carbon into the porous mass in liquid form, as for example, a resin. The porous mass containing such a carbonaceous resin is then thermally processed to decompose or pyrolyze the resin to solid carbon, which may be graphite, amorphous carbon or some combination thereof. A number of carbonaceous resins are available including epoxy resins, phenolic resins and furfuryl alcohol. What is preferred in the present invention are carbohydrate-based resins such as those based on sugars or starches, but if more carbon is desired in the preform, then one may wish to consider resins such as phenolic resin or furfuryl alcohol, which offer higher "char yields". The resin infiltration and pyrolysis cycle may be repeated one or more times, which can also increase carbon content In addition to assisting in the infiltration process, another important role played by the carbonaceous resin is that of an optional binder. Although one can infiltrate a loose mass of reinforcement particulate, the more preferred route, especially where the goal is to make an article of some particular and desired shape, is to use a self-supporting preform. Typically, a loose mass of reinforcement is mixed with a binder, preferably here a carbonaceous binder, and then pressed or cast or molded to a desired shape using techniques known in the art. Curing the binder then renders the formed body self-supporting Careful observation of the differences in infiltratability of various porous masses has enabled these differences to be exploited to advantage. Specifically, and in a preferred embodiment, those materials that are substantially non-infiltratable under the process conditions can be used as "foundation" materials for supporting the porous mass to be infiltrated. This result is significant because these non-infiltratable support materials are usually significantly cheaper than the molds, housings or containers, which are sometimes referred to as "boats", and which are often fabricated from graphite.

Through careful observation and experiment, the present inventors have noted the general conditions (or trends in changing conditions) whereby infiltration tends to occur or is enhanced, and those conditions under which infiltration tends not to occur, or tends to be inhibited. For example, the inventors have observed that reactive infiltration of an infiltrant comprising silicon into a porous mass comprising carbon occurs more robustly when the carbon is present in elemental form rather than chemically combined with other elements. Furthermore, the infiltration is more robust when the elemental carbon is present in three-dimensionally interconnected form, as opposed to discrete particle form. When the porous mass includes a component other than elemental carbon, for example, aluminum nitride, the three-dimensionally interconnected elemental carbon phase could be present as, for example, a coating on at least some of the aluminum nitride bodies. Moreover, the infiltration is more robust when the temperature of infiltration is increased, both in terms of absolute temperature as well as in terms of the homologous temperature (e.g., percentage or fraction of the melting temperature). Still further, infiltration is more robust when conducted under vacuum as opposed to inert gas atmosphere such as argon.

Accordingly, with these parameters in mind, it is possible to design an infiltration setup whereby a first porous mass to be infiltrated is supported by a porous mass which differs in at least one respect with regard to that which is to be infiltrated, and the liquid infiltrant can be caused to infiltrate the first mass but not the supporting mass When the free carbon in the porous mass or preform to be infiltrated is interconnected instead of existing solely as discrete, isolated bodies, the infiltration of silicon-containing metal into the mass generally increases in reliability and robustness. Such a reticulated structure within a preform may result when carbon is added to a porous mass as a resin and the resin is subsequently pyrolyzed. Thus, it is possible to support a porous mass containing silicon carbide plus elemental carbon on a foundation of silicon carbide particulate not containing such free carbon, and infiltrate only the porous mass with silicon-containing infiltrant material. Further, because a silicon-aluminum alloy is capable of discriminating between porous masses containing free carbon in discrete versus interconnected form, conditions may be found (e.g., temperature) whereby such a metal can infiltrate the mass containing the reticulated carbon, but not the mass containing discrete particles of free carbon.

It seems that graphite has been the traditional material of choice for housing the molten infiltrant and preform. In view of the above finding, these graphite containers now can be isolated from direct contact with the molten infiltrant by instead arranging for this indirect support by the non-infiltratable foundation material. This result is significant because it dispenses with the need for graphite structures such as molds or "boats" to directly support the infiltrant material or the preform or porous mass to be infiltrated. Not only are such large graphite containers expensive, but also the silicon-containing infiltrant has a tendency to react with and bond to the graphite, making separation and recovery of the infiltrated body difficult. The graphite containers in particular are frequently damaged or even destroyed. Additionally, such separation and recovery efforts often result in damage to the composite body, which can be relatively brittle without the toughening effects of a non-silicon metal phase. While it is possible to apply a protective coating of, for example, boron nitride to the graphite container or to the preform surface in contact therewith to prevent or minimize the bonding effect, some end uses for the formed body, such as certain semiconductor applications, cannot tolerate the potential for the presence of boron. Moreover, the boron nitride coatings are not robust infiltrant blockers, especially at the higher infiltration temperatures, and often a small breach in the coating allows the infiltrant to infiltrate and react with a large zone of the underlying graphite material. Thus, the present invention permits the graphite containers to be used to support the foundation material, which in turn supports the porous mass to be infiltrated, and/or the infiltrant material, etc. This advance in the art permits these graphite structures to be reused in many more subsequent infiltration runs than they could be used previously. It may be possible even to use a different refractory material that is cheaper than graphite for the housing or container material.

A wide range of sizes of filler material bodies can be successfully infiltrated using the reaction-forming process, e.g., bodies ranging from several millimeters in size down to bodies on the order of a micron in size. Again, when the goal is to produce a body having attributes of a ballistic armor, the filler bodies, and in fact, all of the morphological features making up the ceramic component of the composite body should be kept below about 300-350 microns, and preferably below about 212 microns in size.

In addition to limiting the maximum size of the bodies of filler making up the porous mass, the porous mass of filler material should not be exposed to excessive temperatures, especially during infiltration. In this regard, the instant inventors have successfully infiltrated a porous mass of boron carbide particulate (plus added carbon) at a temperature of about 1550° C. without causing reaction of the boron carbide with the boron-doped silicon infiltrant. Here, "excessive" also refers to temperatures at which ceramic grains can grow appreciably. For example, the transformation of silicon carbide from the beta to the alpha crystallographic form occurs at about 2050° C. The crystallographic transformation is often accompanied by extensive grain growth, which can be observed as a coarsening of the microstructure. Depending upon the exact conditions, it may be possible to heat to a slightly higher temperature (perhaps about 2100° C.) and still avoid this recrystallization; however, it is not known what will happen to the boron carbide component at this temperature. Still, it would be advisable not to conduct the infiltration, or post-process the infiltrated mass, at temperatures in excess of about 2000° C. Again, as afar as producing the instant boron carbide composites is concerned, the lowest temperatures that accomplish the objectives generally are to be preferred.

Moreover, in the reaction-bonding composite systems, a high volume fraction of hard phase(s) should not be accomplished through production of large amounts of the in-situ silicon carbide phase, but instead through the engineering of highly loaded masses of the hard ceramic filler material. For example, the porous mass to be infiltrated preferably contains free or elemental carbon as the carbon source to form the in-situ silicon carbide. The amount of this free carbon should be limited to (generally) no more than about 10 percent by volume of the porous mass, and preferably, no more than about 5 or 6 percent. Thus, in general, the amount of silicon carbide produced in-situ should be limited to no more than about 24 volume percent of the final composite body, and preferably no more than about 12 to 14 percent. Among the problems that result from excessive reaction during the infiltration process are temperature spikes due to the exothermic nature of the chemical reaction of silicon and carbon. Such temperature spikes can cause cracking due to localized thermal expansion. Also, the conversion of elemental carbon to silicon carbide entails a volumetric expansion of about 2.35 times. Thus, large amounts of reaction are also detrimental from the standpoint that the large volumetric change can also lead to cracking.

Of course, the mass or preform to be infiltrated by the silicon-containing infiltrant must be one that is permeable to the infiltrant under the local processing conditions. Given sufficient temperature, e.g., about 2150° C., a porous mass of pure silicon carbide can be infiltrated by silicon metal in a pressureless manner (see for example, U.S. Pat. No. 3,951,587 to Alliegro et al.), but more typically, the porous mass contains some elemental or free carbon to facilitate the process. The more carbon that is present, the more silicon carbide that is produced in-situ. While it is possible to reactively infiltrate a porous mass containing large amounts of carbon, such is generally undesirable in the context of the present invention for a variety of reasons. For example, the molten infiltrant metal will change too much compositionally from one zone in the preform to the next. Large compositional changes are usually undesirable for at least two reasons: First, the altered metal composition may be such that it no longer wets the porous mass to be infiltrated. Second, a porous mass that is successfully fully infiltrated would have to be maintained at some elevated temperature for a period of time to allow the distribution of constituents of the infiltrant metal to equilibrate. For large components, such "annealing times" could be so long as to be impractical.

Figure 8A:
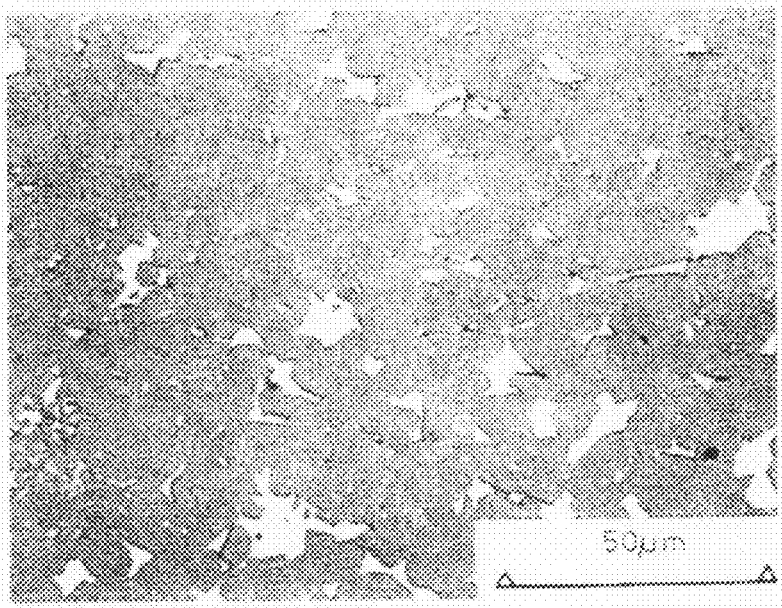
FIGS. 8A and 8B are optical photomicrographs of RBSC composite materials illustrating a coarse microstructure and one of limited interconnectivity of SiC ceramic constituents, respectively.
Figure 8B:
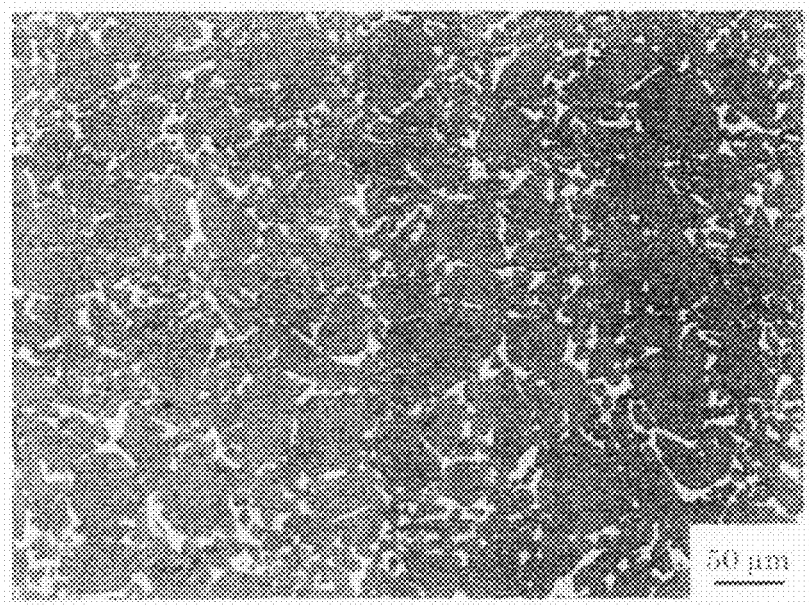

What the instant inventors have noticed, however, is that many of the prior art reaction-bonding publications expressly disclose processing conditions that the inventors identify as entailing "excessive reaction", as warned against immediately above. What results is excessive grain growth and coalescence or fusing of individual grains or morphological features (e.g., grains) into larger ones. See, for example, FIG. 8A. In contrast to this coarse microstructure, the instant inventors have produced silicon-infiltrated composite materials for armor having good ballistic performance and that have microstructures similar to what is shown in FIG. 8B. This microstructure is characterized by minimal chemical reaction, little to no recrystallization of the SiC, and minimal coalescence, sometimes referred to as "clumping". It should be pointed out that these two figures feature SiC and not $B_4C$ as the filler particles, but that does not negate the point being illustrated. Another reason why large amounts of carbon are undesirable is due to the volume change of about 2.35 times upon chemical reaction of the carbon. If the volume of the SiC that is produced cannot be accommodated in the preform, the composite body could swell, hurting dimensional control, or worse, could result in cracking.

Accordingly, the resulting microstructure of the instant armor-grade boron carbide composite materials is one of limited interconnectivity of the bodies making up the boron carbide, and possibly other hard phase(s), provided in the porous mass or preform. In other words, the bodies making up the filler material should have no more than a small or slight amount of interconnectedness to one another such as through excessive sintering or recrystallization, or by excessive in-situ SiC formation.

As a further alternative embodiment, the inventors also note that some applications, most notably the refractory applications, may benefit from having a relatively high degree of interconnection of the preform particles to one another. This can be accomplished by introducing a relatively large amount of carbon to the preform to produce large amounts of in-situ SiC, or by sintering the preform prior to or during infiltration, or some combination of these.

Although not required, the carbon source added to the porous mass or preform for the reaction-bonding embodiment of the invention usually takes the form of elemental carbon, such as graphite. For many applications, particularly those requiring high stiffness, it is desirable that the silicon carbide of the resulting composite body be at least partially interconnected. This outcome is more readily achieved if the carbon in the porous mass or preform is interconnected. Further, interconnected carbon in the porous mass or preform assists the infiltration process in terms of speed and reliability. In a preferred embodiment, the carbon is introduced to the porous mass as a resin. This mixture may then be molded to the desired shape. Curing the resin renders the porous mass self-supporting, e.g., as a preform. During subsequent thermal processing, or during an intervening firing step, typically in a non-oxidizing atmosphere, the resin pyrolyzes to carbon in interconnected form to yield a preform containing at least about 1 percent by volume of carbon. The resin infiltration and pyrolysis cycle may be repeated one or more times if an increase in the carbon content is needed.

Reaction-bonded boron carbide composite bodies are generally cheaper to manufacture than hot pressed boron carbide bodies. Not only may a plurality of RBBC bodies be thermally processed simultaneously, but the tooling (typically graphite) lasts longer than that used in hot pressing operations.

The present RBBC composite materials can be produced to net size and shape better, for example, as a curved tile for a body armor application, than can a hot pressed boron carbide armor tile, as expressed or measured by the achievement of precise net dimensional tolerances. The instant inventors also expect the instant siliconized boron carbide materials to show better dimensional reproducibility than hot pressed boron carbide. Moreover, the present infiltration techniques are more amenable to making large unitary structures, since the high pressures of hot pressing are not required.

As stated above, reaction bonded $B_4C$ is a composite of $B_4C$, SiC and Si. Previously, efforts were made during processing of the material to prevent reaction between the Si and $B_4C$ phases. However, as Section 2.3 above indicated, for heavier ballistic threats, both Si and $B_4C$ are non-optimal for ballistic performance. Accordingly, the instant inventors undertook a number of steps to try to enhance ballistic performance against these heavier threats. At least some of approaches should be combinable, such as combining Approach C with Approaches A or B.

A Reactive Heat Treatment of Reaction Bonded $B_4C$:

In this first approach the composite is processed in a manner so as to promote reaction between Si and $B_4C$. This can be achieved by thermal processing for a longer time, thermal processing at a higher temperature, or using a second thermal processing step (i.e., a reactive heat treatment). Si and $B_4C$ will react to form SiC and $SiB_6$ per the following relationship:

$$1.66\ Si + B_4C \rightarrow SiC + 0.66\ SiB_6$$

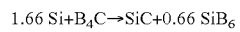

Thus, allowing this reaction to occur will result in reduction or elimination of Si and $B_4C$, both of which, per the Section 3 discussion of the prior art, are a problem for defeat of high pressure ballistic threats.

In addition to reducing or eliminating the presence of Si and $B_4C$, the reaction produces high performance ceramic materials. As is well known, SiC has very positive properties for armor applications. It is hard, relatively light, and is resistant to pressure induced phase transformations. Because of its high cost, $SiB_6$ is less well known in the ceramic armor industry. Nonetheless, its properties are very attractive. It has very low density (2.43 g/cc) and high hardness (~2,600 kg/mm$^2$) [14]. Moreover, it is postulated that it will not have a pressure induced phase transformation problem because its orthorhombic crystal structure is more isotropic than that of the rhombohedral structure of $B_4C$.

To test the concept, a sample of reaction bonded $B_4C$ was heat treated at 1600° C. The result was a microstructure with visibly reduced Si content and increased hardness. These findings are summarized in FIGS. 4A and 4B.

B Reaction Bonded $B_4C$ with Ti Additions to Si Infiltrant

As stated in Section 2.3 of the prior art discussion, a major desire is to eliminate Si from reaction bonded $B_4C$ for next generation SAPI ceramics, as Si will undergo damaging phase transformations when exposed to high pressure impacts. A straight forward way to achieve this goal is to alloy the Si infiltrant with Ti. Then, upon cooling from thermal processing, a titanium silicide intermetallic will form as opposed to, or at least in addition to pure Si. The intermetallic phase will not have the same pressure sensitivity as Si (other alloying elements that form silicides would also be acceptable).

To test the viability of this concept, initial processing trials were performed. The result of one trial is provided in FIGS. 9A and 9B. The use of Ti has increased hardness. Furthermore, based on the processing parameters, the metallic phase should be completely a titanium silicide intermetallic, rather than pure Si.

Moreover, there is great potential for heat treating the Ti-containing composite. With Ti present, desirable phases such as TiC and $TiB_2$, will be formed. These phases are known to provide good armor performance. Moreover, it is likely that any $TiB_2$ that forms will have an elongated morphology due to its hexagonal crystal structure. Such morphology should lead to toughening. To allow durability in the field and multi-hit performance when ballistically impacted, high toughness will be desired.

There is clearly merit for the concept of adding Ti to the reaction bonded $B_4C$ system.

C Reduced Grain Size for Increased Strength:

As the aggressiveness of the SAPI threats increase, the magnitude of collateral damage increases. To allow multi-hit requirements to be met, materials with resistance to collateral damage will be needed. Good correlations between static properties and ballistic performance do not exist. However, with SAPI systems it has clearly been seen that the use of high strength and toughness ceramics leads to enhanced multi-hit performance by limiting collateral damage caused by each impact. Thus, the goal of this phase of the work is to decrease grain size of reaction bonded ceramics, which will lead to improved static properties. Thus, the reaction-bonded ceramics of reduced grain size should show enhanced ballistic performance (both first shot and multi-hit).

Work has been started along this initiative, with typical results shown in FIGS. 10A and 10B. In this case, the particle size of reaction bonded SiC was reduced by a factor of five. This decrease in particle size led to an increase in flexural strength of 33%.

Under most of the prior art silicon infiltration conditions, however, boron carbide is at least somewhat reactive with the molten silicon. Although one reaction product of such reaction is more in-situ silicon carbide, where one is attempting to maximize the boron carbide loading, it would be desirable if the boron carbide could remain substantially unaffected by the infiltrant; that is, it would be desirable if the silicon did not react with the boron carbide. In the reaction-bonding embodiment, the instant invention solves this problem by dissolving some boron into the molten silicon, thereby reducing the activity of the silicon for reaction with boron carbide. Although pure silicon will eventually become saturated in boron and carbon as it reacts with the boron carbide phase in the porous mass or preform, this approach is not preferred, unless this porous mass or preform is "sacrificial", and not the ultimate article of commerce being produced. In many instances, reaction of the boron carbide reinforcement of the porous mass or preform with the silicon infiltrant has led to cracking of the resulting silicon carbide composite body. Instead, what is preferred is to provide a source of boron to the silicon-based infiltrant prior to the infiltrant making contact with the boron carbide in the porous mass or preform. Any boron-containing substance that can be dissolved in silicon may be useful in the context of the instant invention; however, elemental boron and boron carbide are particularly preferred.

One can envision any number of techniques for adding a boron source material to the silicon infiltrant. The approach preferred according to the instant invention is to support the preform to be infiltrated on, and to feed the infiltrant into the preform by way of, kiln furniture consisting of a porous preform comprising boron carbide. Specifically, a silicon-containing infiltrant can infiltrate kiln furniture (later referred to as a "feeder rail" or "beam") containing at least some boron carbide. The kiln furniture may be provided in either the porous condition, e.g., as a preform; or in the "already infiltrated" condition, e.g., as a composite body. The preform that ultimately is intended to become an article of commerce upon infiltration, sometime referred to as the "object" preform, is supported on the kiln furniture. The silicon-containing infiltrant dissolves at least some of the boron carbide of the kiln furniture, and may even become saturated with carbon and/or boron. When this molten silicon then continues to infiltrate into the object preform that is in contact with the kiln furniture, the infiltrating silicon will react very little if at all with the boron carbide in the object preform. Any cracking of the kiln furniture as a consequence of silicon reacting with the boron carbide in the kiln furniture should not unduly affect the continued infiltration of the silicon into the object preform. Of course, the supporting kiln furniture is not required to contain boron carbide per se. Many boron-containing substances in which the boron is able to dissolve in the silicon component of the infiltrant should be satisfactory; however, substances such as boron oxide may not be sufficiently refractory under the thermal processing conditions. Further, the boron source is not required to be located in the kiln furniture; it may be alloyed or otherwise introduced into the silicon component of the infiltrant at most any point prior to the molten silicon making contact with the boron carbide of the object preform. For example, the instant inventors have found it useful when building the "lay-up" for infiltration to supply boron carbide particulate to the bottom of the vessel housing the molten silicon infiltrant, dispersed, for example, as loose powder between the feeder rails. Moreover, the inventors have noticed, at least in the RBBC embodiment, that the presence of a boron nitride coating on the porous mass or preform to be infiltrated also helps suppress the boron carbide reaction.

For silicon infiltrations that rely on little to no reactable carbon in the porous mass or preform, such as the boron carbide siliconizing process, in addition to the boron source, it may also be desirable to add a source of carbon to the molten silicon to suppress the tendency for silicon to dissolve carbon from the boron carbide. Of course, boron carbide provides a carbon source as well as a boron source, but it may be desirable to provide an independent carbon source, such as the many forms of elemental carbon. These can be provided in powdered form, e.g., graphite powder, and may be admixed with the material to make the feeder preforms, or may be admixed with the silicon infiltrant, which often is provided in powdered or chunk form. It also may be the case that carbon additions, independent of a boron source, can provide some measure of reaction suppression.

It should be noted that, at a processing temperature of about 1550° C., only a few weight percent of elemental boron, and perhaps only about 1 wt % or so of carbon, will dissolve in molten silicon. Nevertheless, these amounts should be sufficient to substantially suppress the dissolution or reaction of the boron carbide reinforcement with molten silicon.

As stated in Section 3 of the discussion of prior art, there are issues with Si and $B_4C$ for next generation SAPI applications. Thus, fine grain size alone is likely not a viable solution to the problem. However, the use of fine grain size for improved static properties in combination with the concepts proposed in Sections A and B immediately above may lead to an advanced ceramic that provides both good first strike and multi-hit performance versus the future WC/Co projectiles.

The following Examples will specify in further detail the manufacture of reaction bonded SiC and Reaction bonded $B_4C$ composite materials, and the modifications to these materials described immediately above. The artisan of ordinary skill will appreciate that these Examples are merely illustrative, and in no way limit the overall scope of the invention.

EXAMPLE 1

This example demonstrates the production via reactive infiltration of a Si/SiC composite body containing a boron carbide reinforcement, i.e., Si/SiC/$B_4C$. More specifically, this Example demonstrates the infiltration of a silicon-containing melt into a preform containing an interconnected carbon phase derived from a resinous precursor, and silicon carbide and boron carbide particulates. This Example is for reference, background or comparison purposes, and is not part of the present invention.

Preforms were prepared by a sedimentation casting process. Specifically, about 28 parts of water were added to 100 parts of ceramic particulate and 8 parts of KRYSTAR 300 crystalline fructose (A.E. Staley Manufacturing Co.) to make a slurry. The ceramic particulate content consisted of about equal weight fractions of 220 grit TETRABOR® boron carbide (ESK GmbH, Kempten, Germany, distributed by Micro-Abrasives Corp., Westfield, Mass.) having a median particle size of about 66 microns and 500 grit CRYSTOLON green silicon carbide (St. Gobain/Norton Industrial Ceramics) having a median particle size of about 13 microns (Grade 500 RG). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant (Sil-Clean, Plastic Tooling Supply Co., Exton, Pa.). The wetted rubber mold was then placed onto the graphite plate and allowed to dry. The slurry was poured into the cavity. Vibration was commenced.

The residual liquid on the top of the casting was blotted up with a sponge periodically during sedimentation. After the particulates had fully settled (about 3 hours), vibration was halted. The graphite plate, the rubber mold and the castings inside were transferred from the vibration table to a freezer maintained at a temperature of about minus 20° C. The casting was thoroughly frozen in about 6 hours, thereby forming a self-supporting preform.

From the freezer, the frozen preform was demolded and placed onto a graphite setter tray. The graphite tray and preform were then immediately placed into a nitrogen atmosphere furnace at ambient temperature. The furnace was energized and programmed to heat to a temperature of about 50° C. at a rate of about 10° C. per hour, to hold at about 50° C. for about 8 hours, then to heat to a temperature of about 90° C. at a rate of about 10° C. per hour, to hold at about 90° C. for about 8 hours, then to heat to a temperature of about 120° C. at a rate of about 10° C. per hour, to hold at about 120° C. for about 4 hours, then to heat to a temperature of about 600° C. at a rate of about 50° C. per hour, to hold at about 600° C. for about 2 hours, then to cool down to about ambient temperature at a rate of about 100° C. per hour. This firing operation pyrolyzed the fructose, yielding a well-bonded preform containing about 2.7 percent by weight carbon.

The above-mentioned steps were employed to produce two "beam" or feeder rail preforms and a number of tile preforms. Each tile preform had a mass of about 174 grams and had overall dimensions of about 100 mm square by about 9 mm thick. Each rail preform had a cross-section as depicted in FIG. 1 and measured about 220 mm long by about 15 mm wide by about 25 mm thick. During infiltration of the tile preforms, these rails would serve as a conduit for conducting molten infiltrant toward and into the tile preforms.

Next, a set-up to confine the infiltration process was prepared.

Figure 2A:
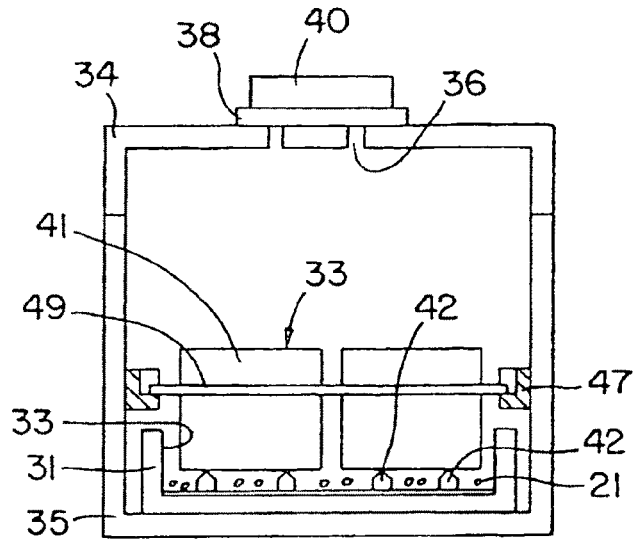
FIGS. 2A and 2B are front and side views, respectively, of a set-up used to prepare the boron carbide reinforced silicon carbide composite tiles of Example 1.
Figure 2B:
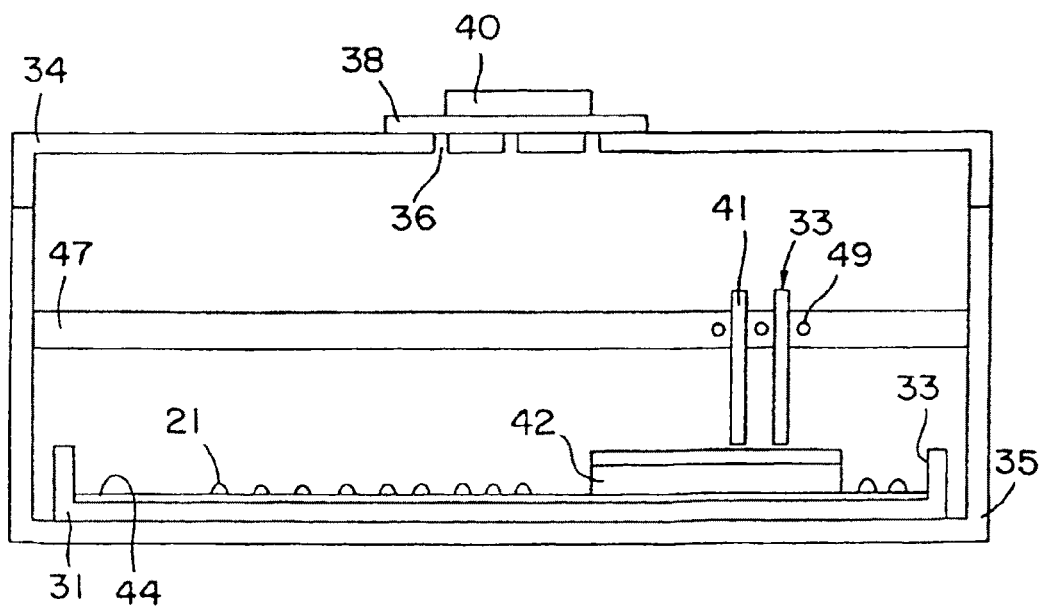

Referring to FIGS. 2A and 2B, the interior surfaces of a Grade ATJ graphite tray 31 (Union Carbide Corp., Carbon Products Div., Cleveland, Ohio) measuring about 790 mm by about 230 mm by about 51 mm deep were spray coated with a boron nitride slurry or paint 33 using a Model 95 Binks spray gun. The boron nitride paint was prepared by diluting about 1800 grams of LUBRICOAT boron nitride paste (ZYP Coatings, Oak Ridge, Tenn.) with deionized water to a volume of about 1 gallon (3.7 liters). Two relatively light coats of this boron nitride paint were applied, with brief ambient temperature drying in air between coats.

The boron nitride-coated tray was then placed into a larger graphite chamber 35 having interior dimensions of about 825 mm long by about 270 mm wide by about 320 mm in height. The chamber also featured means for supporting a parallel row of graphite dowel rods.

Referring now specifically to FIG. 2B, two plies of PANEX®30 low oxidation carbon cloth 44 (Grade PW03, plain weave, 115 g/m², Zoltek Corp., St. Louis, Mo.) weighing about 48 grams and measuring about 790 mm by about 230 mm was placed on the floor of the coated graphite tray 31, 33. Four boron carbide rail preforms 42, each having a mass of about 190 grams and a length of about 200 mm, were placed on top of the cloth and arranged parallel to the length dimension of the tray. Silicon in lump form 21 (Grade LP, Elkem Metals Co., Pittsburgh, Pa.) and comprising by weight about 0.5 percent Fe (max) and the balance Si, was then distributed more or less uniformly over the carbon cloth between the individual preform rails. Calculations showed that about 1510 grams of silicon infiltrant would be required to completely react the elemental carbon and fill the interstices in the cloth, feeder rail preforms and tile preforms; however, about 10% additional silicon was provided to the set-up.

Graphite dowel rods 49 measuring about 0.25 inch (6 mm) in diameter and spray coated with boron nitride 33 were placed into graphite holders or supports 47. A total of fifteen square tile preforms 41 (only four are shown in the Figure) similarly spray coated with boron nitride 33 were placed across the two rails edgewise in each half of the tray. As the boron nitride tended to act as a barrier material hindering over-infiltration, the surface of the tiles that were to contact the boron carbide preform rails were left uncoated.

The top of the chamber was covered with a loose-fitting (non-hermetically sealing) graphite lid 34 featuring a number of approximately 1 cm diameter through-holes 36 to permit atmosphere exchange. The holes were covered with a piece of graphite felt 38 which was held in place with a graphite block 40 which served as a dead load, thereby completing the set-up.

The completed set-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents was recovered from the vacuum furnace, disassembled and inspected. The silicon infiltrant had melted and infiltrated through the carbon cloth, thereby converting the carbon cloth to silicon carbide cloth. The molten silicon infiltrant had also infiltrated through the rail preforms and into the square tile preforms, and reacting with the elemental carbon therein, to form dense, silicon carbide matrix composite bodies having a boron carbide reinforcement. Because each tile preform was supported by the rails in line contact, only low-to-moderate hand force was sufficient to separate the Si/SiC/B$_4$C composite tiles from the feeder rail composite material.

EXAMPLE 2

The technique of Example 1 was substantially repeated, except that no silicon carbide particulate was used in fabricating the preform, and the particle size distribution of the boron carbide was modified such that substantially all particles were smaller than about 45 microns. Following the pyrolysis step, the preforms contained about 75 percent, by volume of the boron carbide particulate and about 4 percent by volume of carbon. This Example similarly is not part of the present invention.

Figure 3:
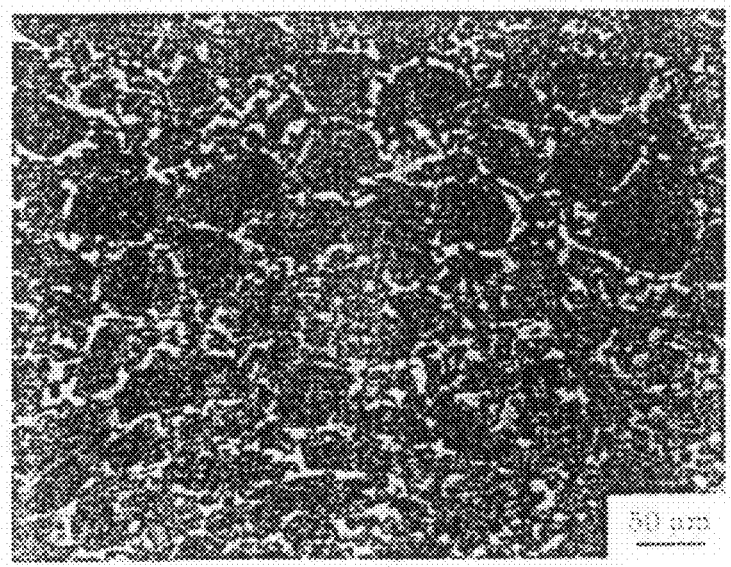
FIG. 3 is an optical photomicrograph of a polished cross-section of the RBBC material produced in accordance with Example 2.

After infiltration, the ceramic material contained nominally 75 vol. % B$_4$C, 9 vol. % reaction-formed SiC, and 16 vol. % remaining Si (i.e., an Si/SiC/B$_4$C composite). A polished section was examined using a Nikon Microphot-FX optical microscope. An optical photomicrograph of the material is shown in FIG. 3. It is clearly evident that, by careful selection of processing conditions, including addition of a source of boron to the silicon infiltrant, little growth and interlocking of the particles has occurred, thus allowing a relatively fine microstructure to be maintained. For instance, the photomicrograph shows little visible reaction between the Si and B$_4$C as a result of the infiltration process.

EXAMPLE 3

The technique of Example 2 was substantially repeated, except that, before supplying the silicon infiltrant to the lay-up, a monolayer of TETRABOR® boron carbide particulate (220 grit, ESK) was sprinkled onto the carbon cloth between the feeder rails. The amount of silicon was concomitantly increased to account for the added boron carbide, and to maintain an excess supply of silicon of about 10 percent, as in Example 1.

COMPARATIVE EXAMPLE I

The technique of Example 2 was substantially repeated, except that silicon carbide particulate was substituted for the boron carbide particulate. As in Example 2, however, the particle size distribution of the silicon carbide blend was such that substantially all particles were smaller than about 45 microns. Following the pyrolysis step, the preforms contained about 75 percent by volume of the silicon carbide particulate and about 4 percent by volume of carbon.

Figure 5:
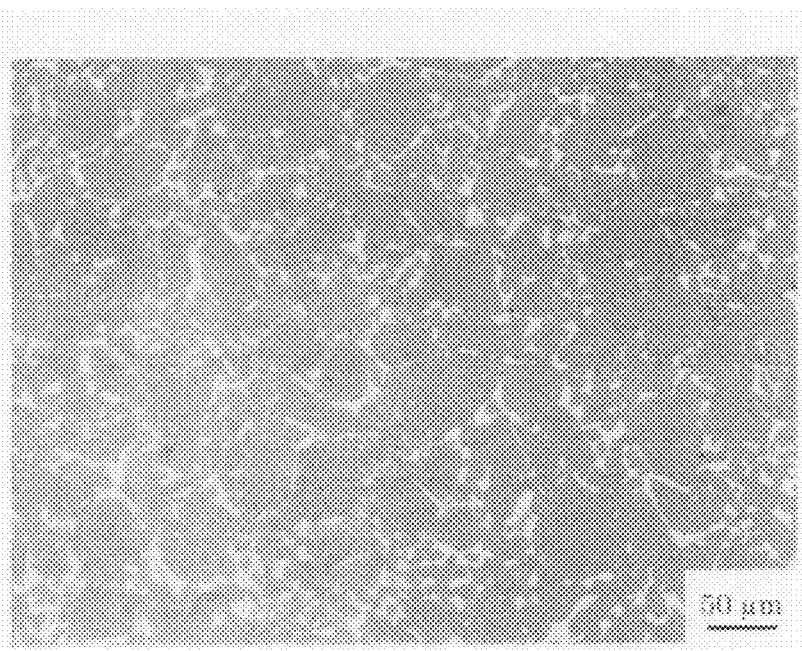
FIG. 5 is an optical photomicrograph of a polished cross-section of the SiC-filled RBSC material produced in accordance with Comparative Example 2.

After infiltration with molten Si, the resultant bodies consisted of 84 vol. % SiC (75 original and 9 reaction formed) and 16 vol. % Si (i.e., an Si/SiC composite). A typical microstructure (optical photomicrograph) of the material is shown in FIG. 5.

In the optical photomicrograph, it is not possible to differentiate between the original SiC and the reaction-formed SiC. As with the reaction bonded B$_4$C of Example 2, the reaction bonded SiC ceramic shown in FIG. 5 displays little interlocking and clustering of the SiC, thus allowing a relatively fine microstructure to be maintained.

COMPARATIVE EXAMPLE II

This example demonstrates the production of a composite body by a reactive infiltration process, the composite body featuring a boron carbide reinforcement. The processing was similar as that of Example 1, with the following exceptions.

The carbon cloth and feeder rails were infiltrated first by themselves; a separate thermal processing was employed to simultaneously infiltrate a total of eight tiles from the infiltrated rails. In place of the boron carbide component, the feeder rail preforms featured silicon carbide as the exclusive reinforcement. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A.E. Staley Manufacturing Co. Decatur, Ill.) to make a slurry. The silicon carbide particulate consisted of about 65 parts by weight of Grade F320 (median particle size of about 29 microns, blocky morphology) and the balance Grade 500 RG (median particle size of about 13 microns, rounded morphology). This slurry was then sedimentation cast in substantially the same manner as was described in Example 1 to produce the feeder rail preforms. A single ply of carbon cloth was used instead of two plies. For the first infiltration (of cloth and rails) the amount of the silicon infiltrant was somewhat in excess of that quantity calculated as being needed to completely react the elemental carbon and fill the interstices between the reinforcement bodies, e.g., particulate and fiber, making up the rails and cloth. The bodies resulting from this first silicon infiltration were silicon carbide composite cloth and feeder rails. From gravimetric analysis, it was determined that there was about 800 grams of uninfiltrated silicon remaining pooled on the silicon carbide cloth.

For the subsequent thermal processing for infiltrating the eight preform tiles, about 602 grams of the lump silicon 21 (Grade LP, Elkem Metals Co., Pittsburgh, Pa.) was distributed on the silicon carbide fabric between the silicon carbide composite (e.g., infiltrated) rails. Eight preform tiles, boron nitride coated as in Example 1, were placed onto the infiltrated rails and supported with boron nitride coated graphite dowel rods as in Example 1.

For both infiltration runs, the heating schedule was substantially the same as described in Example 1.

Following this second infiltration, the chamber and its contents was recovered from the vacuum furnace. The silicon infiltrant had melted, infiltrated through the silicon carbide composite rails and into the tile preforms to form dense, Si/SiC/$B_4C$ composite bodies. Upon recovery of the infiltrated tiles, it was observed that there was a zone about 1-2 cm in diameter extending from each contact point with each rail up into the tile. These zones were of a slightly different shade than the balance of the infiltrated tile, and each featured a crack about 2 cm long extending from the normal shade/off-shade boundary toward the interior of the composite tile.

Figure 6:
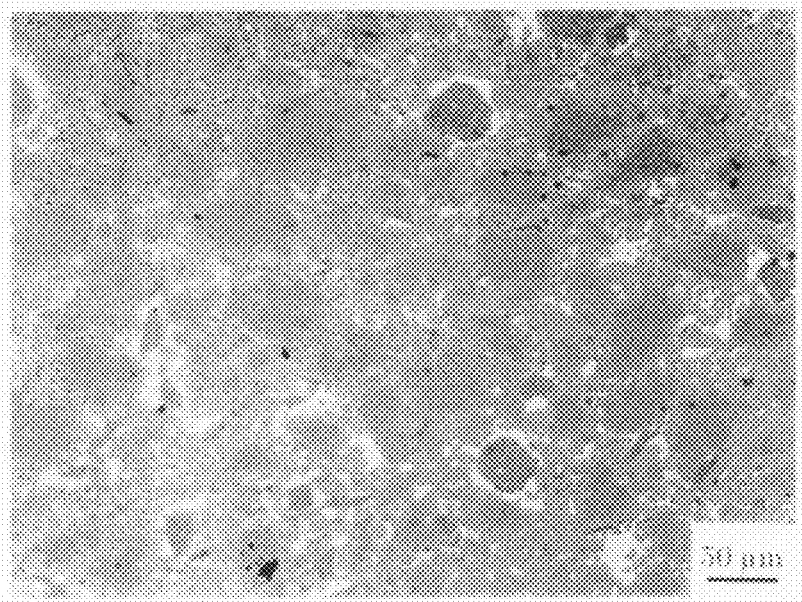
FIG. 6 is an optical photomicrograph of a polished cross-section of the RBBC material produced in accordance with Comparative Example 3.

In FIG. 6, a typical microstructure is shown were Si—$B_4C$ reaction has occurred. Coarsening of the structure (i.e., large ceramic clusters within the Si matrix) is clearly evident. If Si—$B_4C$ reaction is allowed to occur, as was the case in some previous work, the microstructure significantly coarsens. (See for example, the above-referenced U.S. Patents to Bailey and to Taylor et al.) A coarse microstructure leads to a ceramic with a larger flaw size, and thus lower strength.

Characterization of Mechanical and Physical Properties

After the fabrication step, various mechanical and physical properties of the instant reaction-bonded ceramic composite materials were measured. Density was determined by the water immersion technique in accordance with ASTM Standard B 311. Elastic properties were measured by an ultrasonic pulse echo technique following ASTM Standard D 2845. Hardness was measured on the Vickers scale with a 2 kg load per ASTM Standard E 92. Flexural strength in four-point bending was determined following MIL-STD-1942A. Fracture toughness was measured using a four-point-bend-chevron-notch technique and a screw-driven Sintech model CITS-2000 universal testing machine under displacement control at a crosshead speed of 1 mm/min. Specimens measuring 6×4.8×50 mm were tested with the loading direction parallel to the 6 mm dimension and with inner and outer loading spans of 20 and 40 mm, respectively. The chevron notch, cut with a 0.3 mm wide diamond blade, has an included angle of 60° and was located at the midlength of each specimen. The dimensions of the specimen were chosen to minimize analytical differences between two calculation methods according to the analyses of Munz et al. (D. G. Munz, J. L. Shannon, and R. T. Bubsey, "Fracture Toughness Calculation from Maximum Load in Four Point Bend Tests of Chevron Notch Specimens," *Int. J. Fracture,* 16 R137-41 (1980))

Results of density, Young's modulus, flexural strength and fracture toughness of the instant reaction-bonded ceramics are provided in Table 5. When appropriate, the results are provided as a mean+/−one standard deviation.

TABLE 5

| Property | Reaction Bonded SiC | Reaction Bonded $B_4C$ |
|---|---|---|
| Density (kg/m³) | 3060 | 2570 |
| Young's Modulus (GPa) | 384 +/− 2 | 382 +/− 6 |
| Flexural Strength (MPa) | 284 +/− 14 | 278 +/− 14 |
| Fracture Toughness (MPa-m$^{1/2}$) | 3.9 +/− 0.5 | 5.0 +/− 0.4 |

The density of the SiC-based material is about 6% lower than monolithic SiC due to the presence of the Si phase, which has relatively low density. This reduced density is important for applications, such as armor, that are weight specific. The $B_4C$-based material has very low density and is similar to that of monolithic $B_4C$.

The Young's moduli of the reaction bonded SiC and reaction bonded $B_4C$ ceramics are essentially the same, and compare favorably with other high performance ceramic materials. The specific results are as predicted based on the Young's modulus values for dense SiC, $B_4C$ and Si of ~450, ~450 and 120 GPa, respectively. In particular, on a weight specific basis, the reaction bonded $B_4C$ has a very high Young's modulus.

Hardness is a very important parameter for armor materials. Previous work has demonstrated that high mass efficiencies are only obtained versus hard armor piercing projectiles when the projectiles are fractured, and that to effectively fracture the projectile, an armor must have high hardness. (See, for example, M. L. Wilkins, R. L. Landingham, and C. A. Honodel, "Fifth Progress Report of Light Armor Program," Report No. UCRL-50980, University of CA, Livermore, January 1971; also C. Hsieh, "Ceramic-Faced Aluminum Armor Panel Development Studies," Appendix 9 of Report No. JPL-D-2092, Jet Propulsion Laboratory, February 1985.)

However, it is difficult to compare the many hardness data in the open literature because results can be highly dependent on test method and technique. Therefore, for the instant invention many different commercial materials were obtained. Hardness measurements were then made on both the commercial materials and the new reaction bonded ceramics of the instant invention in an identical manner so that true comparisons could be made. The results are provided in Table 6.

TABLE 6

| Material | Vickers' Hardness with 2 kg Load (kg/mm²) |
|---|---|
| 7.62 mm M2 AP Bullet (Tool Steel) | 926 +/− 26 |
| 14.5 mm BS-41 Bullet (WC/Co) | 1644 +/− 30 |
| Sintered AlN | 1044 +/− 63 |
| Pure Si | 1243 +/− 21 |
| 90% Sintered $Al_2O_3$ | 1250 +/− 89 |
| Hot Pressed AlN | 1262 +/− 51 |
| 99.5% Sintered $Al_2O_3$ | 1499 +/− 74 |
| Hot Pressed $Al_2O_3$ | 2057 +/− 82 |
| Hot Pressed $TiB_2$ | 2412 +/− 135 |
| Hot Pressed TiC | 2474 +/− 188 |
| Hot Pressed SiC | 2640 +/− 182 |
| Hot Pressed $B_4C$ | 3375 +/− 212 |
| Reaction Bonded SiC | 2228 +/− 274 |
| Reaction Bonded $B_4C$ | 2807 +/− 54 |

The reaction bonded SiC and $B_4C$ ceramics have very high hardnesses that are well in excess of both tool steel and WC/Co projectiles. In both cases, the Si/SiC and Si/SiC/$B_4C$ composites have hardnesses that more-or-less reflect the weighted average hardness of the constituents. In particular, because of the very high hardness of monolithic $B_4C$, the reaction bonded $B_4C$ has a very high hardness value.

Ballistic Testing

A first round of ballistic testing focused on evaluating the SiC-filled RBSC composite material of Comparative Example 1 to a commercially available hot pressed boron carbide. Candidate ceramic armor materials were provided in the form of square tiles measuring about 100 mm on a side. Among the tiles tested were some that were of substantially the same composition as the silicon carbide breastplates of Comparative Example 1.

The Comparative Example 1 ceramic composite material consisted of about 80 percent by volume of silicon carbide, balance silicon. Its bulk density was about 3.0 g/cc, and its Young's Modulus was about 360 GPa. Further, a RBSC body very similar in composition and processing to this Comparative Example 1 material had a four-point flexural strength of about 270 MPa.

The targets were shot at zero degrees obliquity using two different types of 7.62 mm projectiles at varying velocities. Table 7 shows the comparative ballistic test results against the first threat; Table 8 reports the results against the other threat. The basic unit of ballistic penetration resistance used in this testing is the $V_{50}$, the velocity of the projectile at which partial penetration and complete penetration of the target are equally likely. Normalizing the $V_{50}$ with respect to the total areal density yields a parameter referred to in this disclosure as "ballistic stopping power".

TABLE 7

| Material | Ceramic Areal Dens. (kg/m$^2$) | Backing Areal Dens. (kg/m$^2$) | Calc. $V_{50}$ (m/s) | $V_{50}$ per Unit Total Areal Density (m/kg/s) |
|---|---|---|---|---|
| Comparative Example 1 | 11.48 | 11.83 | 920.2 | 39.5 |
| Hot Pressed $B_4C$ | 16.62 | 5.913 | 996.7 | 44.2 |

TABLE 8

| Material | Ceramic Areal Density (kg/m$^2$) | Backing Areal Density (kg/m$^2$) | Calc. $V_{50}$ (m/s) | $V_{50}$ per Unit Total Areal Density (m/kg/s) |
|---|---|---|---|---|
| Comparative Example 1 | 13.78 | 9.480 | 819.3 | 35.2 |
| Hot Pressed $B_4C$ | 16.62 | 5.913 | 848.3 | 37.6 |

These results were quite encouraging, and indicated that reaction bonded SiC armor could be made competitive from a performance perspective to some of the leading commercially available (e.g., hot pressed) ceramic armors. Accordingly, the instant inventors continued to pursue development of this approach, leading to the instant boron carbide composite materials.

Ballistic Testing

The instant RBBC materials of Example 2 were evaluated as candidate armors, and compared to the SiC-filled RBSC material of Comparative Example 2, as well as to commercial hot pressed $B_4C$ (the control). In one series of tests, the reaction bonded SiC and commercial hot pressed $B_4C$ were tested versus ball rounds as the ballistic projectile; and in a second set of tests, the reaction bonded $B_4C$ and hot pressed $B_4C$ were tested versus armor piercing (AP) rounds.

To produce an armor target for testing, a candidate ceramic tile is attached to a SpectraShield® polymer composite backing layer (AlliedSignal Inc., Morristown, N.J.). This material is supplied as a 54 inch (1370 mm) wide roll consisting of 2 plies of unidirectional fibers embedded in a resin matrix, with the fibers of one ply being orthogonal to the fibers of the other ply. A number of 12-inch (305 mm) wide sheets were cut from the roll. The appropriate number of these sheets were then laminated and consolidated in an autoclave at an applied pressure of about 150 psi (1.3 MPa) at a temperature of about 121° C. for about 60 minutes, thereby forming a rigid polymer composite plate. Following consolidation, a backing plate measuring about 12 inches (305 mm) square was cut from the 54 by 12 inches (1370 by 305 mm) plate using a band saw or water jet. An approximately 5 inch (120 mm) square region in the center of the backing plate was lightly abraded using 120 grit sandpaper. After cleaning the surfaces to be bonded with isopropyl alcohol, a candidate armor tile measuring about 100 mm square was bonded to the center of the backing plate using two plies of 76 microns thick urethane film adhesive. The bond was cured under full vacuum in an oven maintained at a temperature of about 121° C. for about 30 minutes, thereby forming a ballistic test coupon.

The weight of the backing plate was varied according to the number of laminates used; the weight of the ceramic tile was varied according to the thickness dimension to which the ceramic tile was ground. In each instance, however, the total areal density (ceramic tile plus backing material) was maintained at roughly the same amount.

A target for ballistic testing was assembled as follows: The ballistic test coupon was placed in front of 28 plies of KM2 (600 denier) blanket with rip-stop nylon and camouflage cordura covers to simulate the outer tactical vest (OTV) of a body armor. The OTV simulant and test coupon were located in front of a 100 mm thick block of Roma Plastiline modeling clay that had been conditioned at a temperature of about 35° C. for about 6 hours. The test coupon and OTV simulant were secured to the clay block with duct tape, and the clay block was backed up by a steel support structure that was secured to the test table, thereby completing the target.

Ballistic Properties

The results of ballistic testing are provided in Tables 9 and 10. In Table 9, test results versus a 7.62 mm M80 ball round for reaction bonded SiC and commercial hot pressed $B_4C$ (control) are provided. In Table 10, test results versus a 7.62 mm AP M2 round for reaction bonded $B_4C$ and commercial hot pressed $B_4C$ are provided. In each case, the tables provide the areal density of the system, the mass efficiency of the target, and the normalized mass efficiency relative to the hot pressed $B_4C$ control. The mass efficiencies in the tables were determined based on available data for rolled homogeneous steel armor (RHA) versus the same threats. Specifically, the mass efficiency was calculated as the areal density of RHA required to give the same performance divided by the areal density of the tested targets.

TABLE 9

| | Armor System Areal Density kg/m$^2$ (psf) | Mass Efficiency (RHA Equivalent) | Normalized Mass Efficiency |
|---|---|---|---|
| Hot Pressed $B_4C$ (control) | 23.5 (4.82) | 4.56 | 1.00 |
| Reaction Bonded SiC | 23.9 (4.89) | 5.11 | 1.12 |

TABLE 10

| | Armor System Areal Density kg/m² (psf) | Mass Efficiency (RHA Equivalent) | Normalized Mass Efficiency |
|---|---|---|---|
| Hot Pressed B₄C (control) | 29.0 (5.95) | 4.53 | 1.00 |
| Reaction Bonded B₄C | 30.2 (6.18) | 4.85 | 1.07 |

Figure 7A:
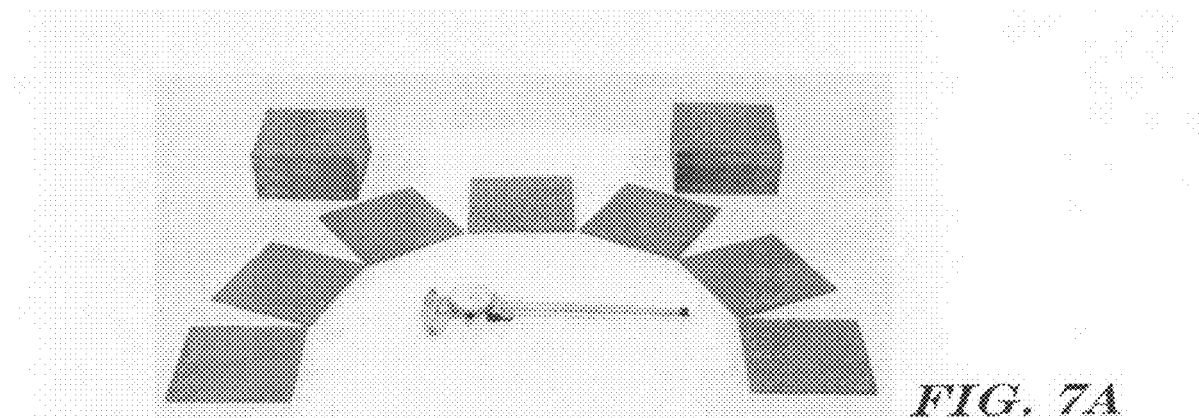
FIGS. 7A-7C illustrate several applications of the armor material embodiment of the instant invention.
Figure 7B:
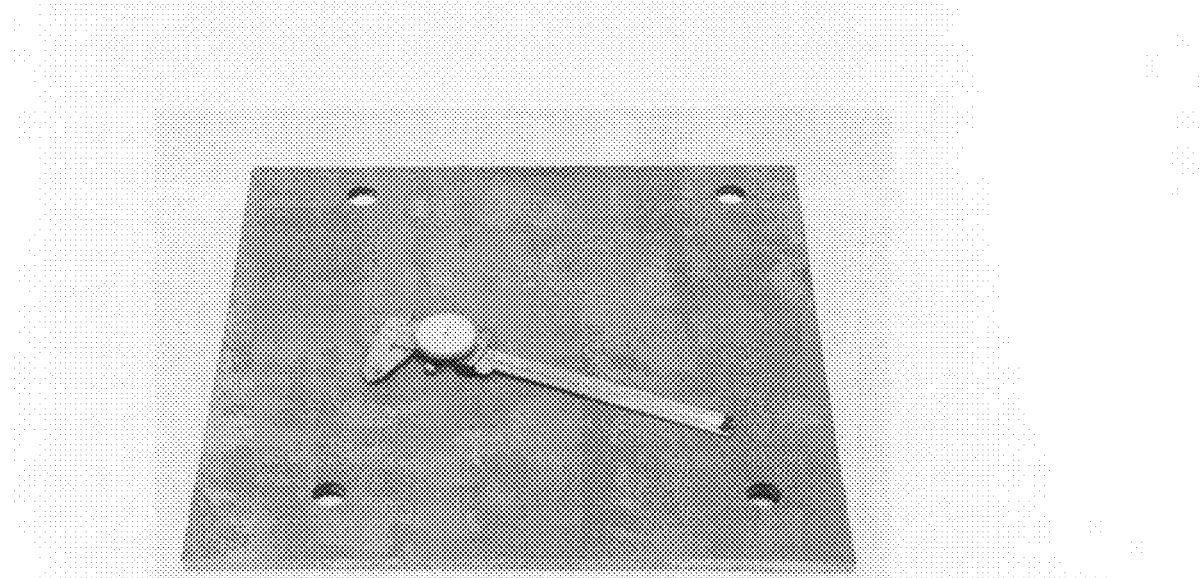
Figure 7C:
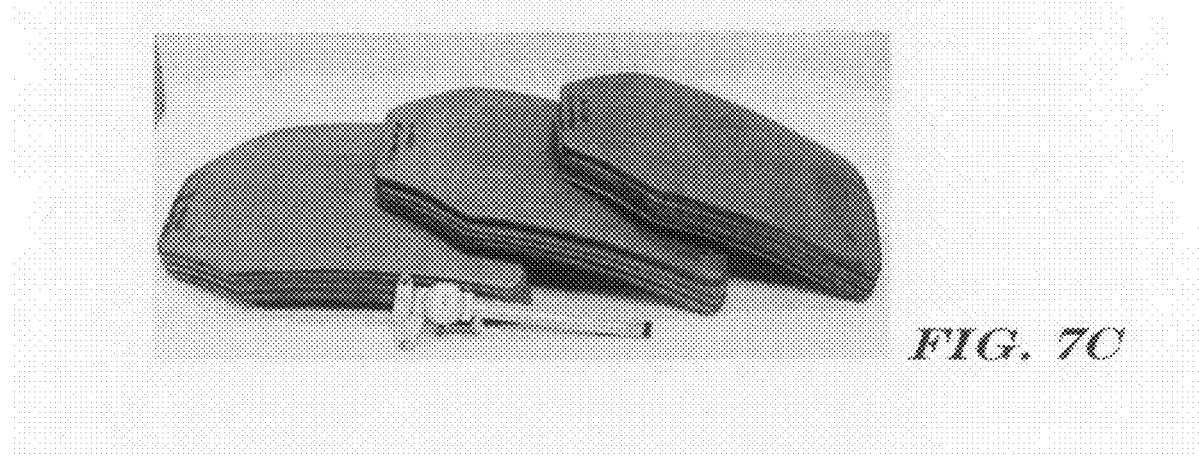

The ballistic results show that the armor designs employing lower cost reaction bonded ceramics had mass efficiencies equivalent to armors of the same design using hot pressed ceramics. This has enabled the production of cost effective armor products for various applications. In FIGS. 7A and 7C, for example, the aircraft armor and personnel armor tiles were fabricated from SiC-filled RBSC. The vehicle armor plate of FIG. 7B was fabricated from RBBC.

EXAMPLE 4

The procedure of Example 1 was substantially repeated, with the following exceptions.

In the preform, the ceramic particulate consisted of nominally 45 micron and nominally 12 micron (median particle sizes) boron carbide particulate (ESK GmbH, Kempten, Germany) mixed in a nominally 70:30 ratio.

Immediately following the freezing step, the gates from the sedimentation casting step were removed, such as with a band saw.

Prior to carbonizing at about 600° C., residual water from casting was removed in a drying step. Specifically, the frozen preform was placed on a graphite setter tray and placed into an air atmosphere convection oven maintained at a temperature of about 110° C. After maintaining the preform at a temperature of about 110° C. for about 30 to 60 minutes, the temperature of the oven was raised to about 180° C. After maintaining a temperature of about 180° C. for at least one hour, the setter tray and preform were removed from the oven and permitted to cool to about 20° C., and the oven was cooled to a temperature of about 110° C. again.

In the setup for conducting the reactive infiltration, instead of spray coating the interior surfaces of the graphite tray 31 with boron nitride slurry or paint, these interiors were lined with SAFFIL alumina fiber sheet material (Saffil Ltd., Cheshire, UK) that had been soaked with the boron nitride slurry, and then dried.

The silicon in lump form that was distributed on the carbon cloth had mixed in it boron carbide particulate (same kind as used in the preform) and THERMAX carbon black powder (Grade N-991, Cancarb, Medicine Hat, Alberta, Canada). To infiltrate about 17.4 kg worth of preform material required about 10.6 kg of silicon, about 0.42 kg of the boron carbide particulate, and about 0.11 kg of the carbon black.

EXAMPLE 5

This Example demonstrates the reactive heat treatment of reaction bonded B₄C.

Two pieces of reaction bonded B₄C composite material ("RBBC") produced according to Example 2 were placed into separate boron nitride coated graphite trays. One tray was stacked atop the other, and the stack was placed into a graphite vessel. Some silicon metal flakes were poured atop the exposed surface of the upper RBBC piece to a depth of about 6 mm, which represented about 10 percent of the mass of that RBBC piece.

The graphite vessel and its contents were placed into a vacuum furnace at about ambient temperature. The furnace was sealed, and evacuated with a roughing pump to a vacuum of about 30 inches (750 mm) of mercury vacuum. After back-filling the furnace chamber with commercially pure nitrogen gas to a pressure of about 1 atmosphere, a rotometer was engaged to meter nitrogen gas into the chamber at a rate of about 7 to 8 liters per minute. The overpressure of nitrogen gas was less than 2 psi gage. The heating units were then energized, and the graphite vessel and its contents were heated to a temperature of about 1600° C. at a rate of about 200° C. per hour. After maintaining a temperature of about 1600° C. for about 6 hours, the furnace chamber was cooled at a rate of about 200° C. per hour. When the chamber temperature was again close to ambient; the flow of nitrogen gas was ceased, and the furnace chamber was opened and the graphite vessel and contents were recovered. Harness analysis on the pieces of RBBC showed that this heat treatment had increased microhardness by about 400 units.

EXAMPLE 6

This Example demonstrates an addition of titanium to a reaction bonded boron carbide (RBBC) composite materials system. The objective was to convert at least some of the residual silicon metal in the composite to one or more silicides of titanium.

Two preforms containing boron carbide and carbon were prepared substantially in accordance with Example 11. One was a flat plat; the other was in the shape of a channel having a "U" cross section. The combined mass of the plate and "U" channel was about 270 grams.

Referring to FIG. 11, the preforms were placed as illustrated into a graphite tray. About 350 grams of commercially pure titanium powder (Ti-Loy 100) were placed on top of the plate and around the base of the "U" channel. The graphite vessel and its contents was then placed into a vacuum furnace at ambient temperature. The furnace chamber was sealed, and evacuated with a roughing pump to a vacuum of about 30 inches (750 mm) of mercury vacuum. The heating units were then energized, and the graphite vessel and its contents were heated to a temperature of about 1800° C. over a period of about 18 hours. After maintaining a temperature of about 1800° C. for about 4 hours, the furnace chamber was cooled to substantially ambient (e.g., about 20° C.) over a period of about 9 hours. When the chamber temperature was again close to ambient, the furnace chamber was opened and the graphite vessel and contents were recovered. The titanium powder had melted, but no liquid titanium had infiltrated the preforms. However, titanium was present throughout at least the "U" channel preform, possibly having permeated the preform from the vapor phase. Some of this titanium may have reacted with at least some of the free carbon present in the preform.

This preform, containing boron carbide, free or reacted carbon (e.g., a titanium carbide), and titanium in free or compound form, or both, was then prepared for silicon metal infiltration. Specifically, this "U" channel preform was placed atop a previously infiltrated RBBC feeder also having the shape of a "U" channel to form an assembly for infiltration. This assembly was then placed into a graphite tray, and silicon metal in lump form (Elkem, 0.5 wt % Fe max as an impurity) to which has been added about 4 wt % boron carbide particulate (TETRABOR) and about 1 wt % carbon black powder (Grade N-991, Cancarb, Medicine Hat, Alberta, Canada) was placed on the floor of the graphite tray in contact with the RBBC feeder. After sealing the furnace chamber and evacuating to about 750 mm of mercury vacuum, the heating elements were energized, and the furnace and its contents were heated from substantially ambient temperature to a temperature of about 1425° C. over a period of about 14 hours. After holding at about 1425° C. for about 3 hours, the temperature was then further increased to about 1525° C. over a period of about 4 hours. After maintaining this temperature of about 1525° C. for about 3 hours, the temperature was reduced to about 1475° C. over a period of about 1.5 hours. After holding at about 1475° C. for about 4 hours, the temperature was further reduced to about 1350° C. over a period of about 5 hours. Upon reaching a temperature of about 1350 C, the temperature was dropped to substantially ambient over a period of about 13 hours, after which the pressure in the chamber was brought back up to ambient, and the furnace was opened. Substantially complete infiltration was achieved, yielding a dense composite body. The boron carbide component appeared to have remained substantially unreacted by the two thermal processing treatments.

SUMMARY AND CONCLUSIONS

In summary, hot pressed $B_4C$ and reaction bonded $B_4C$ provide excellent performance as the ceramic constituent in current SAPI armor systems (lead, soft steel and tool steel threats). However, future SAPI threats, such as the WC/Co M993 projectile, apply impact pressures that cause degradation to the $B_4C$ crystal structure (via phase transformation), thus hurting performance. Moreover, these aggressive next generation threats can cause significant collateral damage, which can negatively impact multi-hit performance. Clearly, improved ceramic materials will be needed.

INDUSTRIAL APPLICABILITY

The instant invention discloses modified versions of reaction bonded $B_4C$ to address these limitations. These modified versions will not display the phase transformation problem (first strike issue) and will possess improved static properties so as to reduce collateral damage (multi-hit issue). The modified reaction bonded $B_4C$ will represent an economically attractive ceramic armor system that possess the performance characteristics needed for next generation SAPI systems. The present modified reaction bonded $B_4C$ materials might also find application as armor for marine vessels and ground-based vehicles, e.g., for heavier threats. Further, although the invention is focused on future threats, the inventive refinements disclosed herein may lead to improved performance versus current threats, such as the aggressive tool steel-based 7.62 mm AP M2.

The boron carbide composite materials of the instant invention possess exceptional hardness and stiffness, low specific gravity and relatively high flexural strength. Although the instant disclosure has focused primarily on the potential application of the instant materials as anti-ballistic armor, they should also find many applications where rigidity and low specific gravity are important materials properties, such as in the robotics, tooling, and other precision equipment industries. The instant composite materials might also be attractive as abrasives or wear-resistant parts. Where the possibility of boron contamination is not a concern, the boron carbide composite materials of the instant invention may find applications in the semiconductor fabrication industry, such as in air bearing housings or support frames, machine tool bridges and bases, mirror stages and flat panel display setters. The instant composite materials might make desirable mirror substrates. Further, these boron carbide composites may find applications in the nuclear industry, specifically, in applications where neutron absorption is important.

An artisan of ordinary skill will readily appreciate that numerous variations and modifications can be made to the invention as disclosed and exemplified above without departing from the scope of the invention as set forth in the appended claims.

REFERENCES

1. CPC Web Site (www.cerpro.com).
2. Ceradyne Web Site (www.ceradyne.com).
3. K. M. Taylor, "Cold Molded Dense Silicon Carbide Articles and Methods of Making the Same," U.S. Pat. No. 3,205,043, Sep. 7, 1965.
4. P. P. Popper, "Production of Dense Bodies of Silicon Carbide," U.S. Pat. No. 3,275,722, Sep. 27, 1966.
5. C. W. Forrest, "Manufacture of Dense Bodies of Silicon Carbide," U.S. Pat. No. 3,495,939, Feb. 17, 1970.
6. R. Morrell, *Handbook of Properties of Technical and Engineering Ceramics*, HMSO Publications, London, U.K., 1985.
7. M. K. Aghajanian, B. N. Morgan, J. R. Singh, J. Mears, R. A. Wolffe, "A New Family of Reaction Bonded Ceramics for Armor Applications", in Ceramic Armor Materials by Design. *Ceramic Transactions,* 134, J. W. McCauley et al. editors, 527-40 (2002).
8. P. G. Karandikar, M. K. Aghajanian and B. N. Morgan, "Complex, Net-Shape Ceramic Composite Components for Structural, Lithography, Mirror and Armor Applications", *Ceram. Eng. Sci. Proc.,* 24 [4] 561-6 (2003).
9: M. K. Aghajanian, B. E. Schultz, K. Kremer, T. R. Holmes, F. S. Lyons and J. Mears, "Tactical Vehicle Armor Systems that Utilize Large, Complex-Shaped Reaction Bonded Ceramic Tiles", $29^{th}$ *Int. Conf. on Advanced Ceramics and Composites,* Cocoa Beach, Fla. 23-28 Jan. 2005 (in-press).
10. P. J. Hazell, S. E. Donoghue, C. J. Roberson and P. L. Gotts, "The Penetration of Armour Piercing Projectiles Through Reaction Bonded Ceramics", $29^{th}$ *Int. Conf. on Advanced Ceramics and Composites,* Cocoa Beach, Fla. 23-28 Jan. 2005 (in-press).
11. Y. Gogotsi, C. Baek, and F. Kirscht "Raman microspectroscopy study of processing-induced phase transformations and residual stress in silicon", *Semicond. Sci. Tech.* 14 936-44 (1999).
12. Y. Gogotsi, G. Zhou, S. S. Ku, and S. Cetinkunt "Raman microspectroscopy analysis of pressure-induced metallization in scratching of silicon". *Semicond. Sci. Tech.* 16 345-52 (2001).
13. M. Chen, J. McCauley and K. J. Hemker, "Shock-Induced Localized Amorphization in Boron Carbide", *Science,* 299 (2003) 1563-6.
14. O. Knoteck and A. Schrey, "Hard and Protective Materials" in Handbook of Thin Film Process Technology, D. Glocker and I. Shah, eds., Institute of Physics Publishing; Philadelphia, Pa., Z1.0-12 (1995).

What is claimed is:
1. A method of making a composite material, comprising:
   (a) providing a porous mass or preform comprising elemental carbon and at least one ceramic material comprising boron carbide;
   (b) providing a source of elemental titanium liquid or vapor;
   (c) contacting said porous mass or preform to said titanium source, thereby causing at least some titanium to penetrate said porous mass or preform to form an intermediate body;

(d) subsequently providing a source of molten silicon metal further comprising boron and carbon;

(e) infiltrating at least some of said molten silicon metal into said intermediate body, and reacting at least some of said infiltrated silicon metal with said titanium previously provided to said intermediate body to form at least one silicide of titanium in said intermediate body; and (f) continuing said infiltrating to a desired extent to form said composite material.

2. The method of claim 1, wherein said titanium and said silicon are provided in at least one of an inert atmosphere and a vacuum.

3. The method of claim 1, wherein said titanium is provided at a temperature of about 1800 C.

4. The method of claim 1, wherein said silicon is provided at a temperature in a range of about 1450 C to about 1600 C.

5. The method of claim 1, wherein said source of molten silicon metal derives from melting of silicon metal in lump form that is mixed with elemental carbon and boron carbide.

6. The method of claim 1, further wherein a portion of said elemental titanium reacts with at least a portion of said elemental carbon to form a titanium carbide.

7. The method of claim 1, wherein said boron carbide remains unreacted by said method.

8. The method of claim 1, wherein said source of elemental titanium liquid or vapor is titanium powder.

9. The method of claim 8, wherein said titanium powder is commercially pure.

10. A method of making a composite material, comprising:

(a) providing a porous mass or preform comprising elemental carbon and at least one ceramic material comprising boron carbide;

(b) providing a source of elemental titanium in a form that comprises at least one of liquid and vapor;

(c) contacting said porous mass or preform to said titanium source, thereby causing at least some titanium to penetrate said porous mass or preform to form an intermediate body;

(d) subsequently providing a source of molten silicon metal; and (e) infiltrating at least some of said molten silicon metal into said intermediate body, and reacting at least some of said infiltrated silicon metal with said titanium previously provided to said intermediate body to form at least one silicide of titanium in said intermediate body, thereby forming said composite material.

11. The method of claim 10, wherein said titanium and said silicon are provided in at least one of an inert atmosphere and a vacuum.

12. The method of claim 10, wherein said titanium is provided at a temperature of about 1800 C.

13. The method of claim 10, wherein said silicon is provided at a temperature in a range of about 1450 C to about 1600 C.

14. The method of claim 10, wherein said source of molten silicon metal further comprises boron and carbon.

15. The method of claim 10, further wherein a portion of said elemental titanium reacts with at least a portion of said elemental carbon to form a titanium carbide.

16. The method of claim 10, wherein said boron carbide remains unreacted by said method.

* * * * *